United States Patent
Nagami et al.

(10) Patent No.: US 9,146,793 B2
(45) Date of Patent: Sep. 29, 2015

(54) MANAGEMENT SYSTEM AND MANAGEMENT METHOD

(75) Inventors: Akihisa Nagami, Yokonama (JP); Atsumi Terayama, Kawasaki (JP); Naoko Ichikawa, Sagamihara (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 13/514,422

(22) PCT Filed: May 18, 2012

(86) PCT No.: PCT/JP2012/003282
§ 371 (c)(1),
(2), (4) Date: Jun. 7, 2012

(87) PCT Pub. No.: WO2013/171807
PCT Pub. Date: Nov. 21, 2013

(65) Prior Publication Data
US 2013/0311645 A1    Nov. 21, 2013

(51) Int. Cl.
*G06F 15/173* (2006.01)
*G06F 11/07* (2006.01)

(52) U.S. Cl.
CPC .......... *G06F 11/0709* (2013.01); *G06F 11/079* (2013.01); *G06F 11/0757* (2013.01)

(58) Field of Classification Search
CPC ............ G06F 11/0727; G06F 11/0757; G06F 11/3419; G06F 11/3485; G06F 2201/81; G06N 7/005
USPC ........................................................ 709/224
See application file for complete search history.

(56) References Cited

U.S. PATENT DOCUMENTS

| | | | |
|---|---|---|---|
| 8,606,919 B2* | 12/2013 | Akiyama et al. | 709/226 |
| 8,667,496 B2* | 3/2014 | Levin | 718/104 |
| 2009/0138884 A1* | 5/2009 | Kakeda et al. | 718/104 |
| 2009/0313198 A1* | 12/2009 | Kudo et al. | 706/47 |
| 2010/0058108 A1* | 3/2010 | Nammatsu et al. | 714/4 |
| 2011/0231899 A1* | 9/2011 | Pulier et al. | 726/1 |
| 2012/0117573 A1 | 5/2012 | Kudo et al. | |
| 2012/0222029 A1* | 8/2012 | Watanabe et al. | 718/1 |
| 2013/0097304 A1* | 4/2013 | Asthana et al. | 709/224 |

(Continued)

FOREIGN PATENT DOCUMENTS

JP    2011-518359 A    6/2011

OTHER PUBLICATIONS

PCT International Search Report and Written Opinion on application PCT/JP2012/003282 mailed Aug. 6, 2012; 12 pages.

*Primary Examiner* — Jerry Dennison
(74) *Attorney, Agent, or Firm* — Foley & Lardner LLP

(57) ABSTRACT

A management system outputs catalog data, which has been created based on catalog-source data comprising data showing at least an application of a relevant resource with respect to each of multiple providable resources, and which shows the respective applications of the multiple resources, and receives a selection of a resource to be provided from the multiple resources. The management system provides the selected resource as a provided resource, and determines, based on a performance threshold configured with respect to the application of the provided resource, whether or not a performance measurement value, which relates to the processing performance of a network service using the provided resource and which can be monitored by the management system, is normal.

13 Claims, 30 Drawing Sheets

(56) References Cited

U.S. PATENT DOCUMENTS

2013/0275970 A1* 10/2013 Heim et al. .................. 718/1
2013/0290506 A1* 10/2013 Astete et al. ................ 709/223
2013/0290960 A1* 10/2013 Astete et al. .................. 718/1
2014/0075013 A1* 3/2014 Agrawal et al. ............. 709/224

* cited by examiner

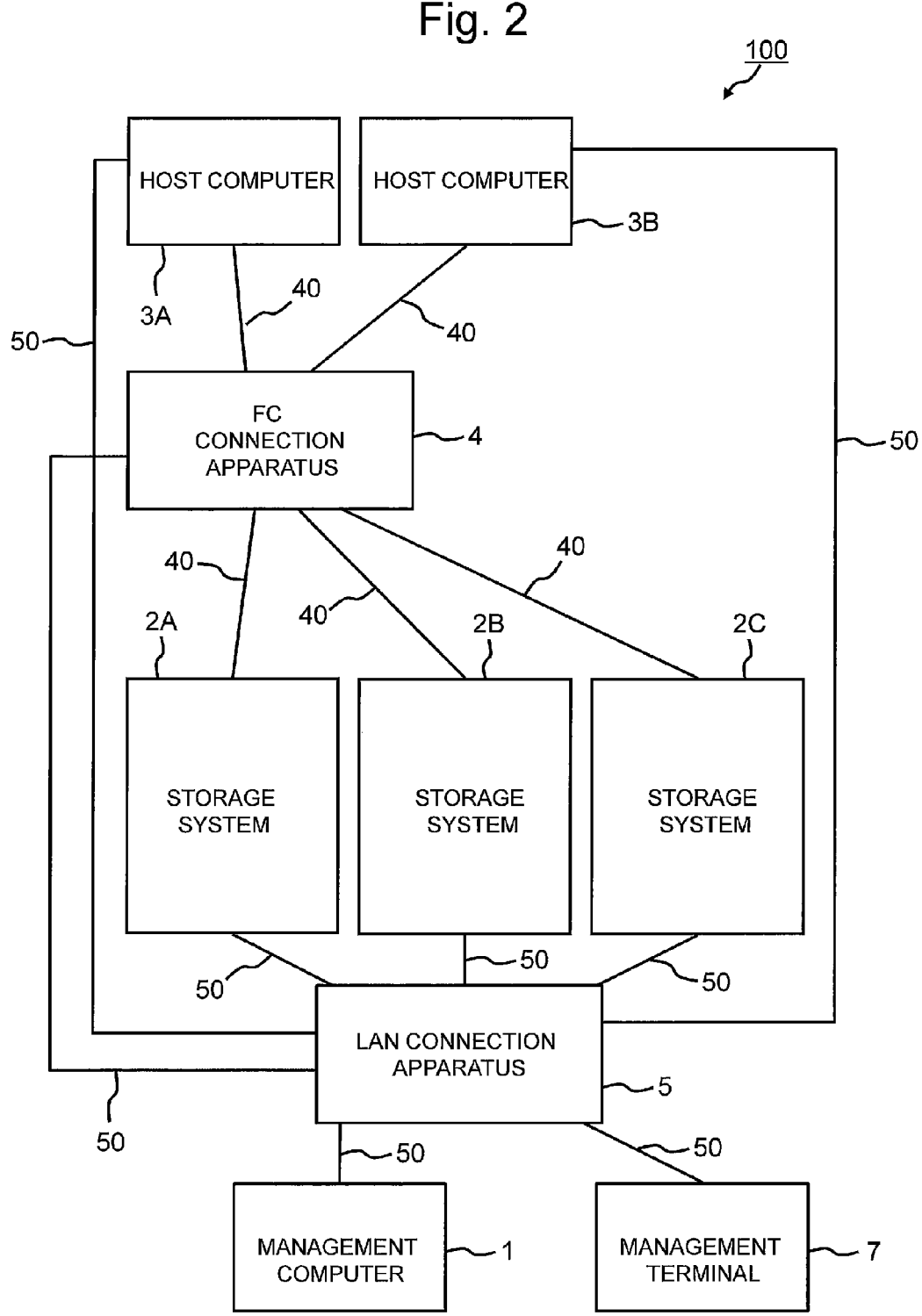

Fig. 15A

SERVICE TEMPLATE A (3-TIER WEB APPLICATION)                    1406

| IMAGE | VIRTUAL /PHYSICAL | CPU | MEMORY | NUMBER OF DEPLOYING UNITS | DISK | NW I/O RESPONSE THRESHOLD | DISK I/O RESPONSE THRESHOLD | CPU UTILIZATION THRESHOLD | MEMORY USAGE THRESHOLD |
|---|---|---|---|---|---|---|---|---|---|
| Web1.ovf | VIRTUAL | 1GHz | 1GB | 1 UNIT | 10GB SATA | 10sec | 100ms | ... | ... |
| App1.ovf | VIRTUAL | 2GHz | 4GB | 1 UNIT | 50GB SAS | 5sec | 40ms | ... | ... |
| DB1.ovf | VIRTUAL | 4GHz | 16GB | 1 UNIT | 100GB SSD+SAS | 3sec | 30ms | ... | ... |
| JOB | — | — | — | — | — | 10sec | ... | ... | ... |

Column labels: 1406a 1406b 1406c 1406d 1406e 1406f 1406g 1406h 1406i 1406j

1406y: Web1.ovf, App1.ovf rows; 1406z: DB1.ovf row

Fig. 15B

SERVICE TEMPLATE B (3-TIER WEB APPLICATION)                    1406

| IMAGE | VIRTUAL /PHYSICAL | CPU | MEMORY | NUMBER OF DEPLOYING UNITS | DISK | NW I/O RESPONSE THRESHOLD | DISK I/O RESPONSE THRESHOLD | CPU UTILIZATION THRESHOLD | MEMORY USAGE THRESHOLD |
|---|---|---|---|---|---|---|---|---|---|
| Web2.ovf | VIRTUAL | 1GHz | 1GB | 1 UNIT | 10GB SATA | 10sec | 100ms | ... | ... |
| App2.ovf | VIRTUAL | 2GHz | 4GB | 1 UNIT | 50GB SAS | 5sec | 40ms | ... | ... |
| DB2.ovf | PHYSICAL | 4GHz | 16GB | 1 UNIT | 100GB SSD+SAS | 3sec | 30ms | — | — |
| JOB | — | — | — | — | — | 10sec | ... | ... | ... |

1406y: Web2.ovf, App2.ovf rows; 1406z: DB2.ovf row

Fig. 15C

SERVICE TEMPLATE C (VM TEMPLATE)                    1406

| IMAGE | VIRTUAL /PHYSICAL | CPU | MEMORY | NUMBER OF DEPLOYING UNITS | DISK | NW I/O RESPONSE THRESHOLD | DISK I/O RESPONSE THRESHOLD | CPU UTILIZATION THRESHOLD | MEMORY USAGE THRESHOLD |
|---|---|---|---|---|---|---|---|---|---|
| VM1.ovf | VIRTUAL | 1GHz | 1GB | 1 UNIT | 10GB SATA | 10sec | 100ms | ... | ... |

1406y: VM1.ovf row

Fig. 16

| # | SERVICE TEMPLATE NAME | APPLICATION | QUALITY |
|---|---|---|---|
| 1 | SERVICE TEMPLATE A | 3-TIER WEB APPLICATION | NORMAL |
| 2 | SERVICE TEMPLATE B | 3-TIER WEB APPLICATION | HIGH RELIABILITY |
| 3 | SERVICE TEMPLATE C | VM TEMPLATE | NORMAL |

Fig. 17

| MACHINE NAME | CONFIGURATION | Hypervisor | Datastore |
|---|---|---|---|
| WebVM1 | VIRTUAL MACHINE | Sv1 | Vol1 |
| App VM1 | VIRTUAL MACHINE | Sv2 | Vol3 |
| DB VM1 | VIRTUAL MACHINE | Sv3 | Vol4 |
| Web VM2 | VIRTUAL MACHINE | Sv1 | Vol1 |
| App VM2 | VIRTUAL MACHINE | Sv2 | Vol3 |
| DB PM2 | PHYSICAL MACHINE | — | Vol5 |
| Web VM3 | VIRTUAL MACHINE | Sv1 | Vol2 |
| ... | ... | ... | ... |

Fig. 18

| Group | VM name | NW I/O RESPONSE THRESHOLD | DISK I/O RESPONSE THRESHOLD | CPU UTILIZATION THRESHOLD | MEMORY USAGE THRESHOLD | STATUS (NORMAL/ABNORMAL) |
|---|---|---|---|---|---|---|
| Grp1 | ENTIRE GROUP | ... | ... | ... | ... | ... |
|  | Web VM1 | 10sec | 100ms | ... | ... | ... |
|  | App VM1 | 5sec | 40ms | ... | ... | ... |
|  | DB VM1 | 3sec | 30ms | ... | ... | ... |
| Grp2 | ENTIRE GROUP | ... | ... | ... | ... | ... |
|  | Web VM2 | 10sec | 100ms | ... | ... | ... |
|  | App VM2 | 5sec | 40ms | ... | ... | ... |
|  | DB VM2 | 3sec | 30ms | ... | ... | ... |
| ... | ... | ... | ... | ... | ... | ... |

Fig. 19A

Web VM1

1410

| | 1410a | 1410b | 1410c | 1410d | 1410e |
| Time | NW I/O RESPONSE | DISK I/O RESPONSE | CPU UTILIZATION | MEMORY USAGE |
|---|---|---|---|---|
| 0:00:00 | 2.5 sec | 25ms | ... | ... |
| 0:01:00 | 1.5 sec | 18ms | ... | ... |
| 0:02:00 | 1.8 sec | 20ms | ... | ... |
| 0:03:00 | 2.1 sec | 10ms | ... | ... |
| ... | ... | ... | ... | ... |

| | 1410a | 1410b | 1410c |
| Time | NW I/O RESPONSE | DISK I/O RESPONSE |
|---|---|---|
| 0:00:00 | 2.5 sec | 25ms |
| 0:01:00 | 1.5 sec | 18ms |
| 0:02:00 | 1.8 sec | 20ms |
| 0:03:00 | 2.1 sec | 10ms |
| ... | ... | ... |

Fig. 20

Table 1411:

| SERVER NAME (1411a) | VIRTUAL/PHYSICAL (1411b) | CPU (1411c) | ALLOCATED CPU (1411d) | MEMORY (1411e) | ALLOCATED MEMORY (1411f) |
|---|---|---|---|---|---|
| Sv1 | VIRTUAL | ... | ... | ... | ... |
| Sv2 | VIRTUAL | ... | ... | ... | ... |
| Sv3 | VIRTUAL | ... | ... | ... | ... |
| Sv4 | PHYSICAL | ... | ... | ... | ... |
| ... | ... | ... | ... | ... | ... |

Fig. 21

Table 1412:

| VOLUME NAME (1412a) | VIRTUAL/PHYSICAL (1412b) | CAPACITY (1412c) | ALLOCATED CAPACITY (1412d) | ACCESSIBLE SERVER (1412e) |
|---|---|---|---|---|
| Vol1 | VIRTUAL | 100GB | 40GB | Sv1, Sv2 |
| Vol2 | VIRTUAL | 100GB | 35GB | Sv1, Sv2 |
| Vol3 | VIRTUAL | 100GB | 60GB | Sv2, Sv3 |
| Vol4 | VIRTUAL | 100GB | 45GB | Sv2, Sv3 |
| Vol5 | PHYSICAL | 50GB | 50GB | Sv4 |
| ... | ... | ... | ... | ... |

Fig. 22A

Vol1     2417

| Time | IOPS | RESPONSE TIME |
|---|---|---|
| 0:00:00 | ... | 25ms |
| 0:01:00 | ... | 18ms |
| 0:02:00 | ... | 20ms |
| 0:03:00 | ... | 10ms |
| ... | ... | ... |

Vol2     2417

| Time | IOPS | RESPONSE TIME |
|---|---|---|
| 0:00:00 | ... | 25ms |
| 0:01:00 | ... | 18ms |
| 0:02:00 | ... | 20ms |
| 0:03:00 | ... | 10ms |
| ... | ... | ... |

| Time 343a | NW I/O RESPONSE 343b | DISK I/O RESPONSE 343c | CPU UTILIZATION 343d | MEMORY USAGE 343e |
|---|---|---|---|---|
| 0:00:00 | 2.5 sec | 25ms | ... | ... |
| 0:01:00 | 1.5 sec | 18ms | ... | ... |
| 0:02:00 | 1.8 sec | 20ms | ... | ... |
| 0:03:00 | 2.1 sec | 10ms | ... | ... |
| ... | ... | ... | ... | ... |

| Time 343a | NW I/O RESPONSE 343b | DISK I/O RESPONSE 343c | CPU UTILIZATION 343d | MEMORY USAGE 343e |
|---|---|---|---|---|
| 0:00:00 | 2.5 sec | 25ms | ... | ... |
| 0:01:00 | 1.5 sec | 18ms | ... | ... |
| 0:02:00 | 1.8 sec | 20ms | ... | ... |
| 0:03:00 | 2.1 sec | 10ms | ... | ... |
| ... | ... | ... | ... | ... |

Fig. 24

Port1  445

| Time 445a | DISK I/O RESPONSE 445b |
|---|---|
| 0:00:00 | 25ms |
| 0:01:00 | 18ms |
| 0:02:00 | 20ms |
| 0:03:00 | 10ms |
| ... | ... |

MANAGEMENT SYSTEM AND MANAGEMENT METHOD

TECHNICAL FIELD

The present invention relates to the management of a computer system.

BACKGROUND ART

Until now, for example, a management system, which monitors the performance of a computer system and performs cause analysis on a failure which has occurred in the computer system, has been known.

For example, the technology cited below in Patent Literature 1 discloses technology for performing cause analysis. A root cause analysis engine uses event durations and gradual deletion of events to improve analysis accuracy and reduce the number of required calculations. Matching ratios of relevant rules are recalculated every time notification of an event is received. The calculation results are held in a rule memory in the analysis engine. Each event has a valid duration, and when the duration has expired, the relevant event is deleted from the rule memory. Events held in the rule memory can be deleted without affecting other events held in the rule memory. The analysis engine can then recalculate the matching ratio of each rule by executing the recalculation only for the affected rules related to the deleted event. Calculation costs can be reduced because the analysis engine processes events either incrementally or decrementally. The analysis engine can determine the most likely conclusion even when one or more condition elements are not true.

CITATION LIST

Patent Literature

PTL 1: Japanese Translation of PCT Application No. 2011-518359

SUMMARY OF INVENTION

Technical Problem

In a management system of a computer system, the administrator of the computer system may not be able to directly monitor the states of either a portion of the apparatuses inside the computer system or the physical or logical devices inside an apparatus.

For example, in a case where a computer system is a private cloud, such as IaaS (Infrastructure as a Service), for example, an apparatus, which is used from among the apparatuses in the computer system by a tenant administrator, who is a cloud service user, belongs to the tenant administrator's management area. For this reason, the computer system administrator is unable to acquire required information from the apparatus being used by the tenant administrator and cannot directly monitor the state of the apparatus being used by the tenant administrator. In accordance with this, it is impossible for the computer system administrator to perform cause analysis for a failure, particularly a performance failure (for example, when expected input/output performance is unable to be achieved), which has occurred within the computer system. Also, in a case where a failure has occurred, the computer system administrator must notify the tenant administrator of the failure in a case where the cause of this failure is on the cloud service utilization side, and in a case where the cause of this failure is on the cloud service provision side, must issue a notification of the failure to the person in charge of the faulty apparatus in the computer system. However, under circumstances in which it is impossible to directly monitor the states of a portion of the apparatuses inside the computer system, it is not possible to distinguish whether the cause of the failure is on the cloud service utilization side or the cloud service provision side.

Solution to Problem

A management system manages a computer system, which provides a resource used in the provision of a network service. The management system comprises a storage device, and a control device, which is coupled to this storage device. The storage device stores catalog-source data for each of multiple providable resources comprising data showing at least the applications of the relevant resources. The control device outputs catalog data, which is created based on the catalog-source data and shows the respective applications of the multiple resources, and receives a selection of a resource to be provided from the multiple resources. The control device provides the selected resource as a provided resource, and determines whether or not a measurement value, which is related to the processing performance of a network service utilizing the provided resource and which can be monitored by the management system, is normal based on a performance threshold configured in relation to the provided resource application.

BRIEF DESCRIPTION OF DRAWINGS

FIG. 2 is a block diagram of an example of a computer system related to an embodiment.

FIG. 15A is a block diagram of a first example of a service template related to the embodiment. FIG. 15B is a block diagram of a second example of the service template related to the embodiment. FIG. 15C is a block diagram of a third example of the service template related to the embodiment.

FIG. 16 is a block diagram of an example of a service template list related to the embodiment.

FIG. 17 is a block diagram of an example of a machine management table related to the embodiment.

FIG. 18 is a block diagram of an example of a machine group management table related to the embodiment.

FIG. 19A is a block diagram of a first example of a machine performance management table related to the embodiment. FIG. 19B is a block diagram of a second example of a machine performance management table related to the embodiment.

FIG. 20 is a block diagram of an example of a server management table related to the embodiment.

FIG. 21 is a block diagram of an example of a storage management table related to the embodiment.

FIG. 22A is a block diagram of a first example of a volume performance information storage table related to the embodiment. FIG. 22B is a block diagram of a second example of a volume performance information storage table related to the embodiment.

FIG. 23A is a block diagram of a first example of a virtual machine performance information storage table related to the embodiment. FIG. 23B is a block diagram of a second example of a virtual machine performance information storage table related to the embodiment.

FIG. 24 is a block diagram of an example of a Disk I/O performance information storage table related to the embodiment.

DESCRIPTION OF EMBODIMENTS

Figure 1:
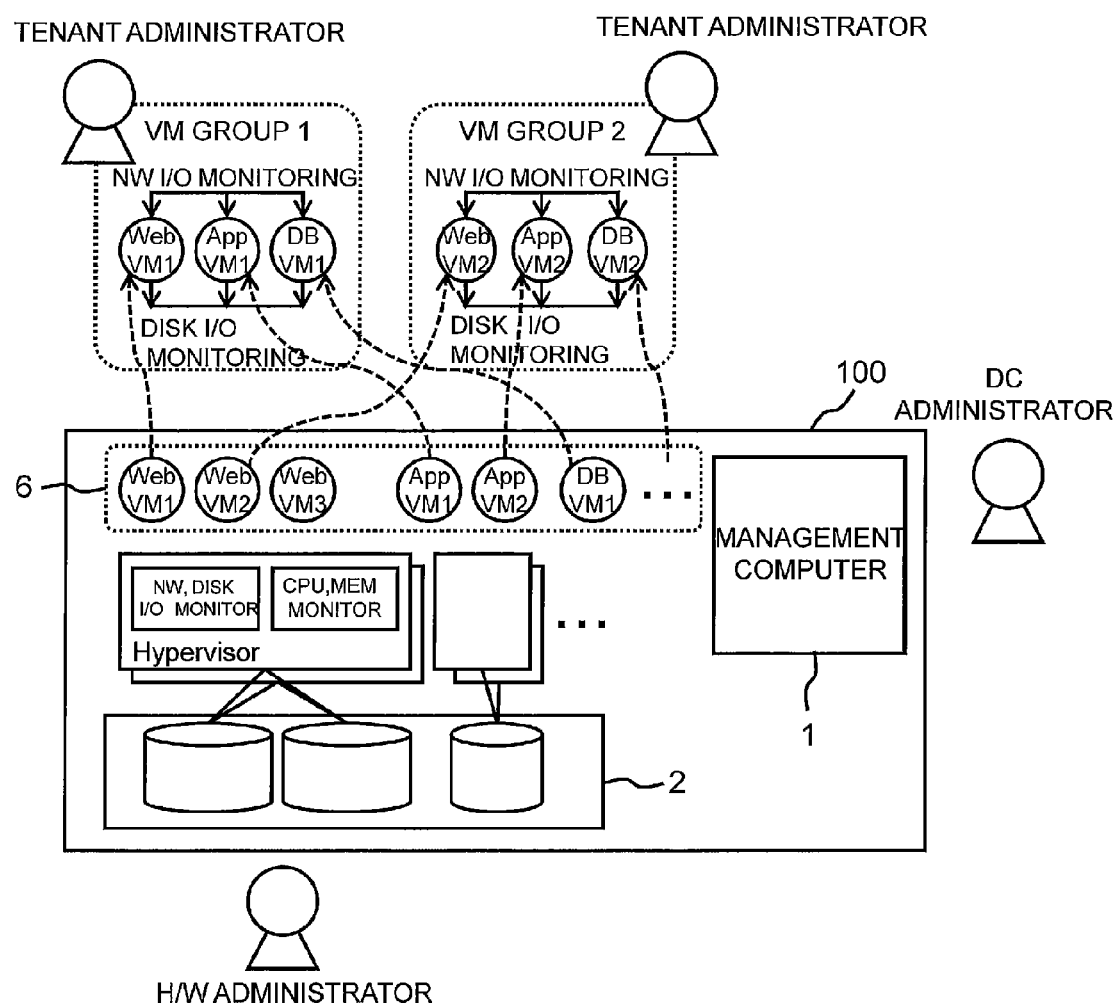
FIG. 1 is a diagram for illustrating an example of the problem.

The embodiment of the present invention will be explained by referring to the drawings. The embodiment explained hereinbelow does not limit the invention of the claims. Also, not all of the components and combinations thereof explained in the embodiment are essential to the solution of the invention. In the drawings, like reference signs describe similar components throughout the multiple views.

Furthermore, in the following explanation, the information of the present invention is explained using expressions such as "aaa table" and "aaa list", but this information may also be expressed using a data structure other than a table, a list, a DB, or a queue. Therefore, to show that this information is not dependent on the data structure, "aaa table", "aaa list" and so forth may be called "aaa information".

When explaining the content of the respective information, the expressions "identification information", "identifier", "name" and "ID" are used, but these expressions are interchangeable.

In the following explanation, there may be cases where an explanation is given using a "program" as the doer of the action, but since the stipulated processing is performed in accordance with a program being executed by a processor while using a memory and a communication port (a communication I/F), the explanation may also give the processor as the doer of the action. A process, which is disclosed as having the program as the doer of the action, may be regarded as a process performed by a computer, such as a management computer. Furthermore, either all or a portion of a program may be realized in accordance with dedicated hardware. Various types of programs may be installed in respective computers using a program delivery server or computer readable storage media.

Hereinafter, a set of one or more computers, which manage a computer system and displays display information of the invention of the application, may be called a management system. In a case where a management computer displays the display information, the management computer is the management system.

Furthermore, a combination of the management computer and a display computer which displays the display information is the management system. Furthermore, the same processing as that of the management computer may be realized using multiple computers to increase the speed and enhance the reliability of the management process, and in accordance with this, the relevant multiple computers (to include a display computer in a case where a display computer carries out displays) are the management system.

FIG. 1 is a diagram for illustrating an example of the problem.

A computer system 100 is an IaaS system for providing a storage infrastructure. A tenant administrator is the person, who is using the storage infrastructure, and the computer system 100 executes a server program and provides a prescribed business service to a user by making use of a provided resource (in the example of FIG. 1, a virtual machine (VM) 6, which is configured to be able to use a volume of a storage system 2). The tenant administrator does not know the configuration of the storage infrastructure, and as such, in a case where a failure has occurred, is not able to identify whether the cause thereof is on the storage infrastructure utilization side, that is, the business service side, for example, in the server program being executed by the tenant administrator, or on the storage infrastructure provision side, that is, the resource provisioning side, for example, in the storage system 2. The tenant administrator normally queries the DC (data center) administrator concerning the cause of a failure.

The DC administrator is the administrator of the computer system 100. The DC administrator is responsible for enhancing the rate of utilization of the storage system 2, and for performing load balancing when the load is concentrated on a specific storage system 2. The DC administrator wants to prevent a performance failure from becoming obvious by taking steps to identify a storage system 2 on which load is concentrated before receiving a performance failure-related query from the tenant administrator. However, the DC administrator does not know the configuration of the management area side of the tenant administrator, for example, what server program is running on the virtual machine 6, and does not know how much performance the tenant administrator needs. Also, the DC administrator is not able to acquire the necessary information from the virtual machine 6 being used by the tenant administrator or the server program being executed using this virtual machine 6, and is unable to directly monitor the status of this virtual machine 6. Thus, it is impossible for the DC administrator to determine whether or not a performance failure is occurring in the computer system 100, and in a case where a performance failure has occurred, to identify whether the cause thereof is on the business service side or on the resource provisioning side. Furthermore, a H/W (hardware) administrator is the person in charge of managing the hardware, such as the storage system 2.

An embodiment for resolving such problems will be explained hereinbelow.

FIG. 2 is a block diagram of an example of a computer system related to the embodiment.

The computer system 100 comprises a management computer 1, one or more storage systems 2 (2A, 2B, 2C, and so forth), one or more host computers 3 (3A, 3B, and so forth), a management terminal 7, a SAN (Storage Area Network) 40, and a LAN (Local Area Network) 50. The SAN 40 employs a FC (Fibre Channel) connection scheme, and comprises one or more FC connection apparatuses 4. The LAN 50 comprises one or more LAN connection apparatuses 5. The storage system 2 and the host computer 3 are coupled together via the SAN 40. The management computer 1, the management terminal 7, the storage system 2, and the host computer 3 are coupled together via the LAN 50. The SAN 40 may employ an iSCSI (Internet Small Computer System Interface) connection scheme.

Figure 3A:
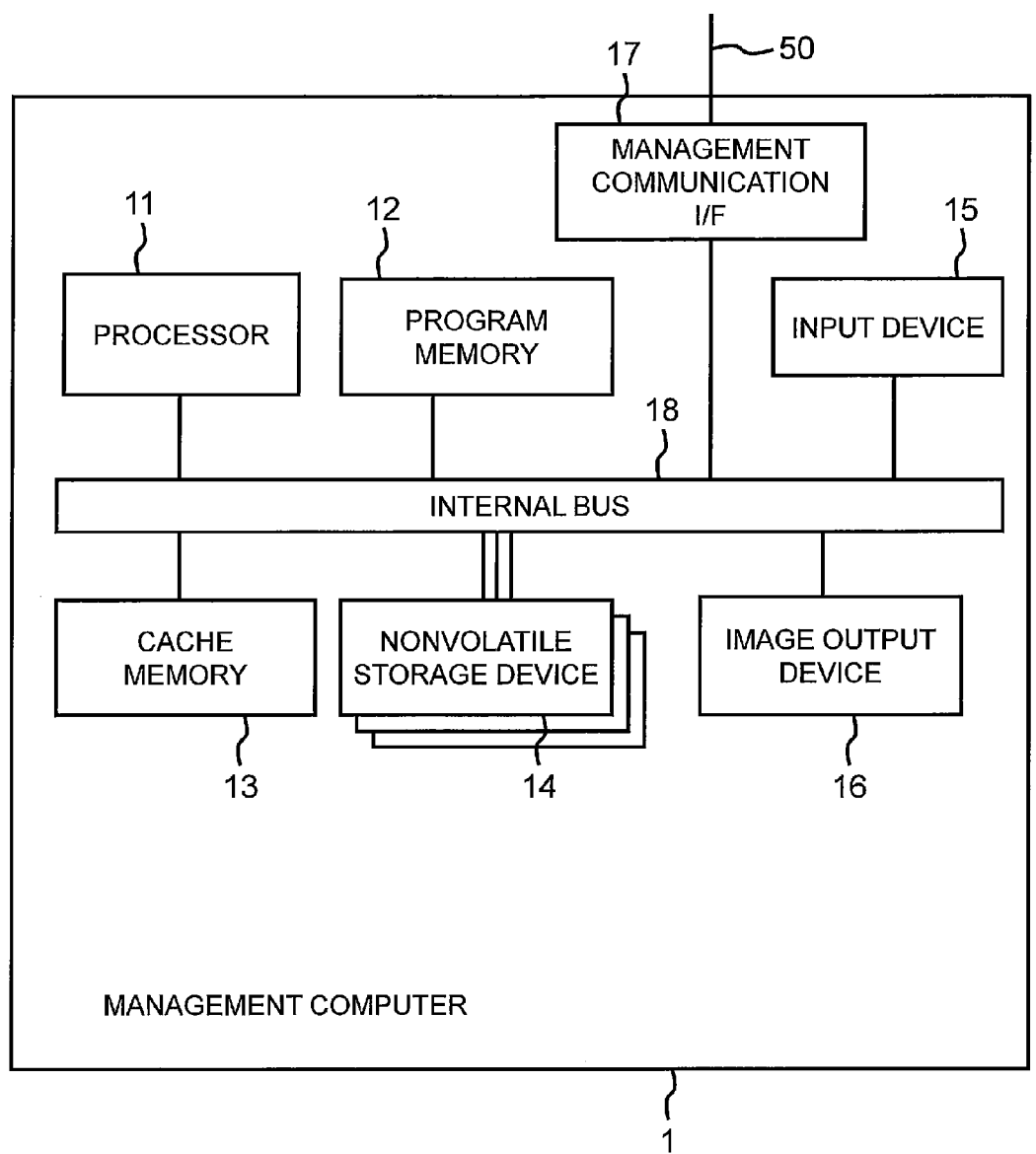
FIG. 3A is a block diagram of an example of a management computer related to the embodiment.

FIG. 3A is a block diagram of an example of a management computer related to the embodiment.

The management computer 1 is for managing the computer system 100. The management computer 1 comprises a processor 11, a program memory 12, a cache memory 13, one or more nonvolatile storage devices 14, an input device 15, an image output device 16, a management communication I/F (interface) (hereinafter simply referred to as "management I/F") 17, and an internal bus 18. The processor 11, the program memory 12, the cache memory 13, the nonvolatile storage device 14, the input device 15, the image output device 16, and the management I/F 17 are coupled together via the internal bus 18. The processor 11 executes various types of programs, which are loaded into the program memory 12 from the nonvolatile storage device 14. The nonvolatile storage device 14 may be a memory, a secondary storage device, such as a hard disk drive (HDD), or a combination of a memory and a secondary storage device. The nonvolatile storage device 14 stores the programs executed by the processor 11, and various types of information used by the processor 11. The management I/F 17 is an interface device for connecting to the LAN 50. The input device 15 is for the DC administrator to input information into the management computer 1, and, for example, is a keyboard, a mouse, or the like. The image output device 16 is for outputting the results of processing executed by the management computer 1, and, for example, is a display or the like. Furthermore, the management computer 1 may comprise an input/output I/F instead of the input device 15 and the image output device 16, and a display computer coupled via the input/output I/F may realize the functions of the input device 15 and the image output device 16.

Figure 3B:
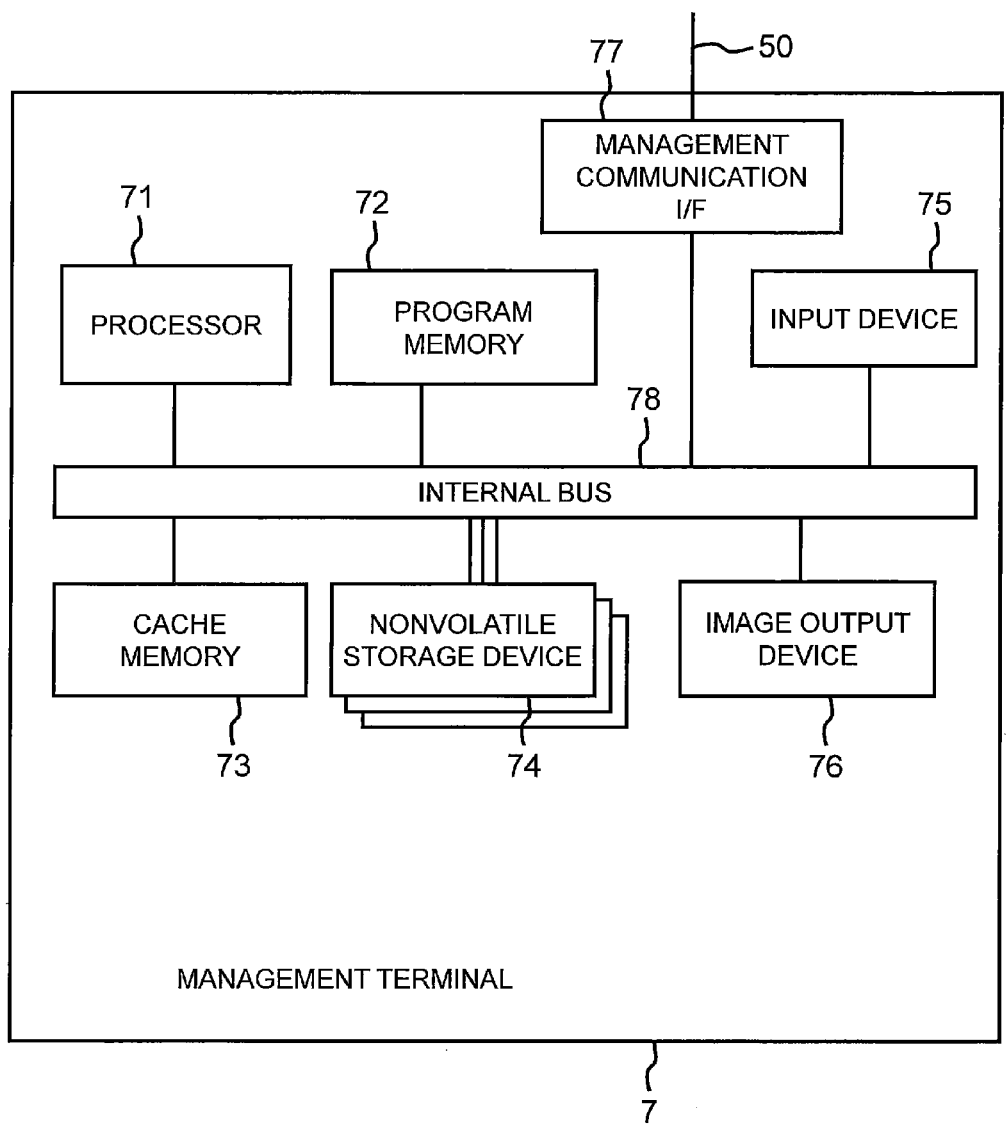
FIG. 3B is a block diagram of an example of a management terminal related to the embodiment.

FIG. 3B is a block diagram of an example of a management terminal related to the embodiment.

The management terminal 7 is for accessing the management computer 1. The management terminal 7 comprises a processor 71, a program memory 72, a cache memory 73, one or more nonvolatile storage devices 74, an input device 75, an image output device 76, management I/F 77, and an internal bus 78. The processor 71, the program memory 72, the cache memory 73, the nonvolatile storage device 74, the input device 75, the image output device 76, and the management I/F 77 are coupled together via the internal bus 78. The processor 71 executes various types of programs, which are loaded into the program memory 72 from the nonvolatile storage device 74. The nonvolatile storage device 74 may be a memory, a secondary storage device, such as a hard disk drive (HDD), or a combination of a memory and a secondary storage device. The nonvolatile storage device 74 stores the programs executed by the processor 71, and various types of information used by the processor 71. The management I/F 77 is an interface device for connecting to the LAN 50. The input device 75 is for the tenant administrator to input information into the management terminal 7, and, for example, is a keyboard, a mouse, or the like. The image output device 76 is for outputting the results of processing executed by the management terminal 7, and, for example, is a display or the like.

Figure 4A:
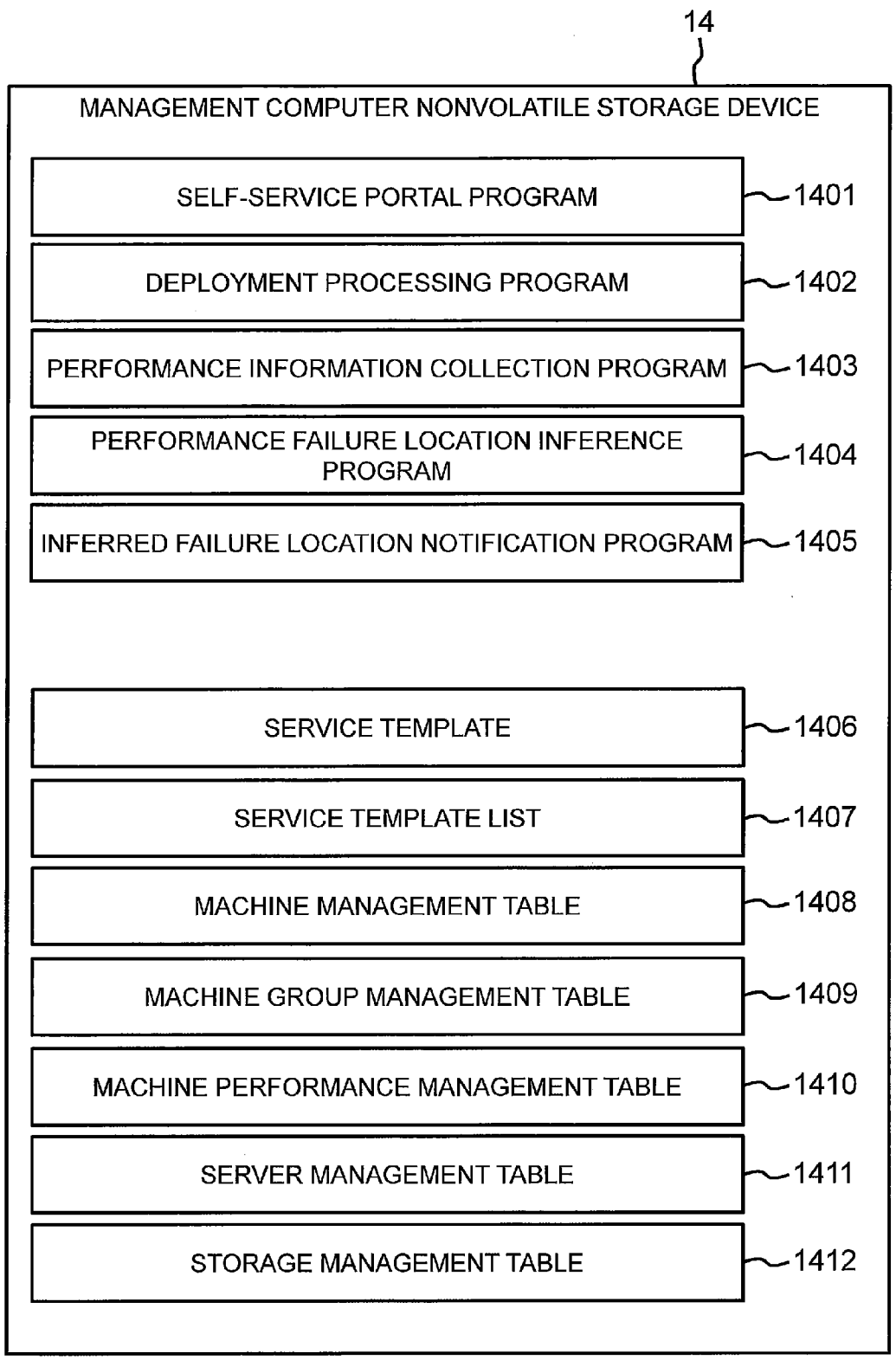
FIG. 4A is a diagram showing an example of the internal configuration of a nonvolatile storage device in the management computer related to the embodiment.

FIG. 4A is a diagram showing an example of the internal configuration of the non-volatile storage device of the management computer related to the embodiment.

The nonvolatile storage device 14 of the management computer 1 stores a self-service portal program 1401, a deployment processing program 1402, a performance information collection program 1403, a performance failure location inference program 1404, and an inferred failure location notification program 1405.

The self-service portal program 1401 performs processing for providing the tenant administrator with catalog data showing the content of resources capable of being provided by the computer system 100, and receiving a selection from the tenant administrator of a resource to be used by the tenant administrator. The resources capable of being providing by the computer system 100 here, for example, are a storage system 2 volume, and a server machine configured to be able to use the storage system 2 volume, and in the embodiment, is the server machine configured to be able to use the storage system 2 volume. Server machine (hereinafter may be referred to simply as "machine") signifies a physical machine, which is the host computer 3 itself in a case where the host computer 3 functions as a physical machine, and signifies a virtual machine 6 running on the host computer 3 in a case where the host computer 3 functions as a virtual server. The deployment processing program 1402 performs the processing for deploying a server machine selected by the tenant administrator (hereinafter referred to as "deployment process"). The performance information collection program 1403 performs processing for collecting performance measurement values measured with respect to the server machine. The performance failure location inference program 1404 performs processing (performance failure location inference processing) for determining whether or not a performance failure has occurred based on the collected performance measurement value, and, in a case where the determination is that a performance failure has occurred, inferring the location, which is the cause of this performance failure. The inferred failure location notification program 1405, based on the result of the performance failure location inference process, performs processing for notifying an performance failure location administrator that a performance failure has occurred.

Figure 4B:
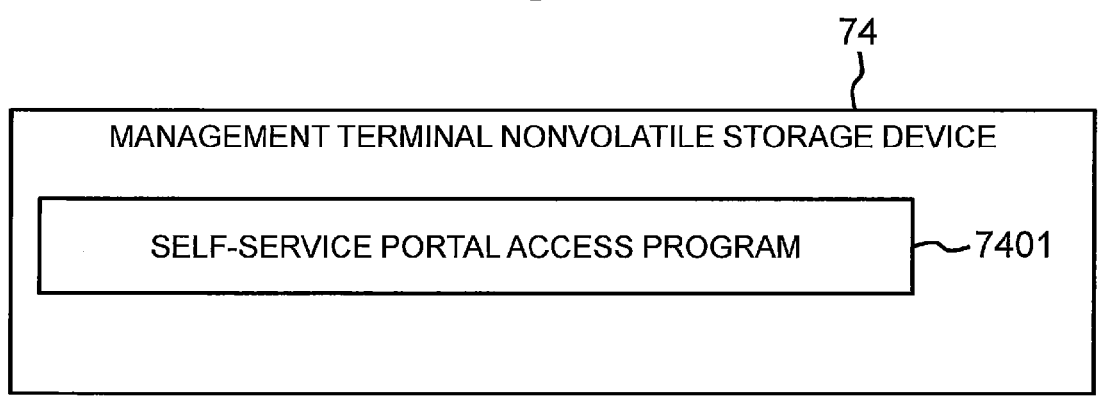
FIG. 4B is a diagram showing an example of the internal configuration of a nonvolatile storage device in the management terminal related to the embodiment.

FIG. 4B is a diagram showing an example of the internal configuration of the non-volatile storage device of a management terminal related to the embodiment. The non-volatile storage device 74 of the management terminal 7 stores a self-service portal access program 7401.

The self-service portal access program 7401 is for accessing a self-service portal provided by the self-service portal program 1401 of the management computer 1. By using the management terminal 7, the tenant administrator accesses the management computer 1, acquires and browses a service template list 1407, and implements a server machine deployment instruction by selecting a template therefrom.

The nonvolatile storage device 14 of the management computer 1 also stores a service template 1406, the service template list 1407, a machine management table 1408, a machine group management table 1409, a machine performance management table 1410, a server management table 1411, and a storage management table 1412. The service template 1406 is data (catalog-source data) comprising data showing at least the resource applications for each of multiple resources capable of being provided to the tenant administrator. The various types of information 1406 through 1412 stored in the nonvolatile storage device 14 will be described further below.

Figure 5:
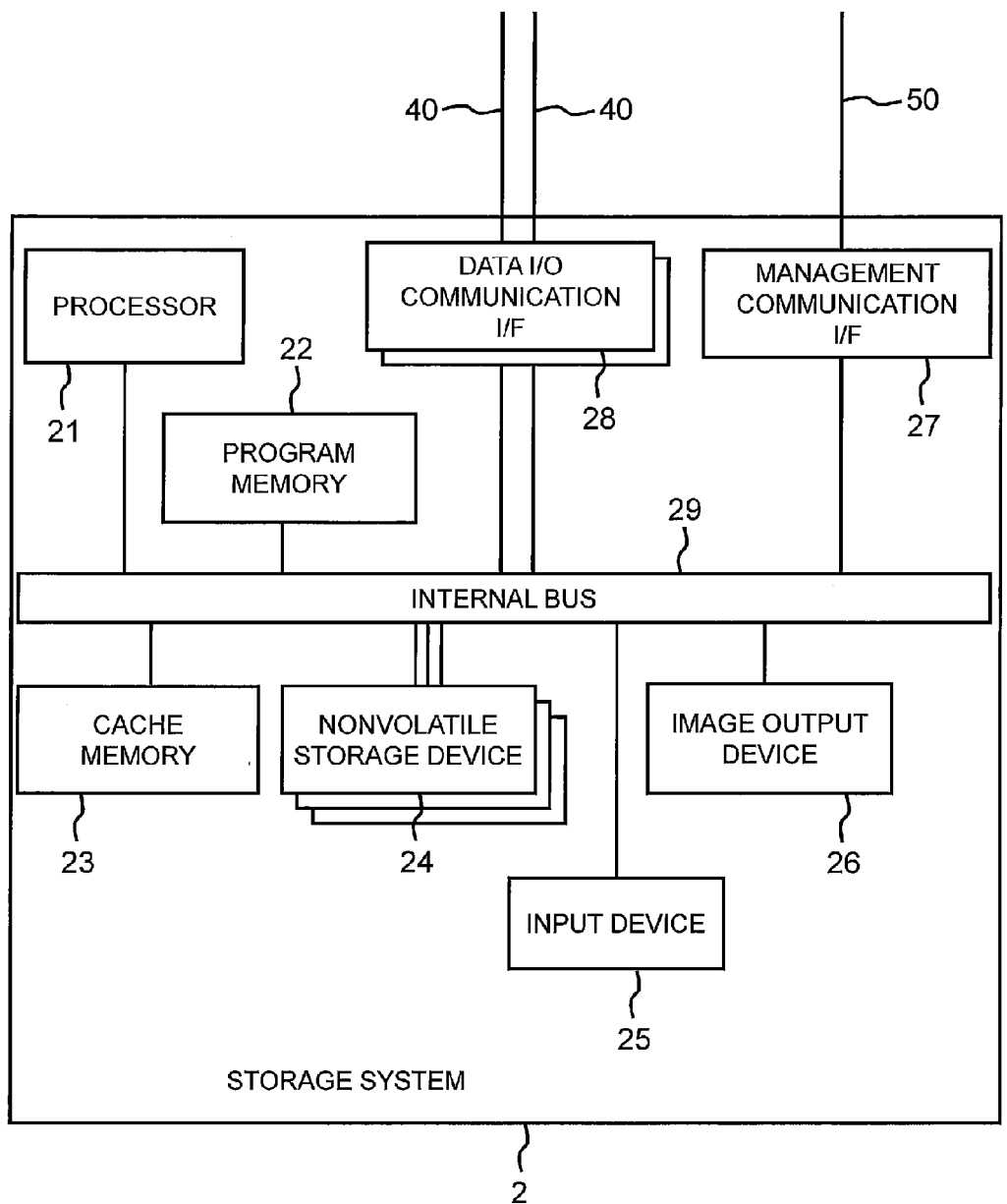
FIG. 5 is a block diagram of an example of a storage system related to the embodiment.

FIG. 5 is a block diagram of an example of a storage system related to the embodiment.

The storage system 2 is an apparatus for providing a volume to the host computer 3 or the like. The storage system 2 comprises a processor 21, a program memory 22, a cache memory 23, multiple nonvolatile storage devices 24, an input device 25, an image output device 26, a management I/F (management communication I/F) 27, one or more data I/O (input/output) communication I/Fs (hereinafter referred to simply as "data I/F") 28, and an internal bus 29. The processor 21, the program memory 22, the cache memory 23, the nonvolatile storage device 24, the input device 25, the image output device 26, the management I/F 27, and the data I/F 28 are coupled together via the internal bus 29. The processor 21 executes various types of programs loaded into the program memory 22 from the nonvolatile storage device 24. The nonvolatile storage device 24 may be any of a HDD (Hard Disk Drive), a solid state storage medium, or an optical storage medium, or may be another type of storage medium. The storage system 2 related to the embodiment comprises multiple types of nonvolatile storage devices 24, for example, SSD (Solid State Drive) media, SAS (Serial Attached SCSI) media, and SATA (Serial ATA) media. The storage system 2 provides the host computer 3 or the like with a volume created based on a storage area of the nonvolatile storage device 24. The management I/F 27 is an interface device for connecting to the LAN 50, and is used primarily when inputting and outputting management data (for example, performance information). The data I/F 28 is an interface device for connected to the SAN 40, and is used primarily when inputting and outputting user data (for example, data written to a volume of the storage system 2, and data read from a volume of the storage system 2).

Figure 6:
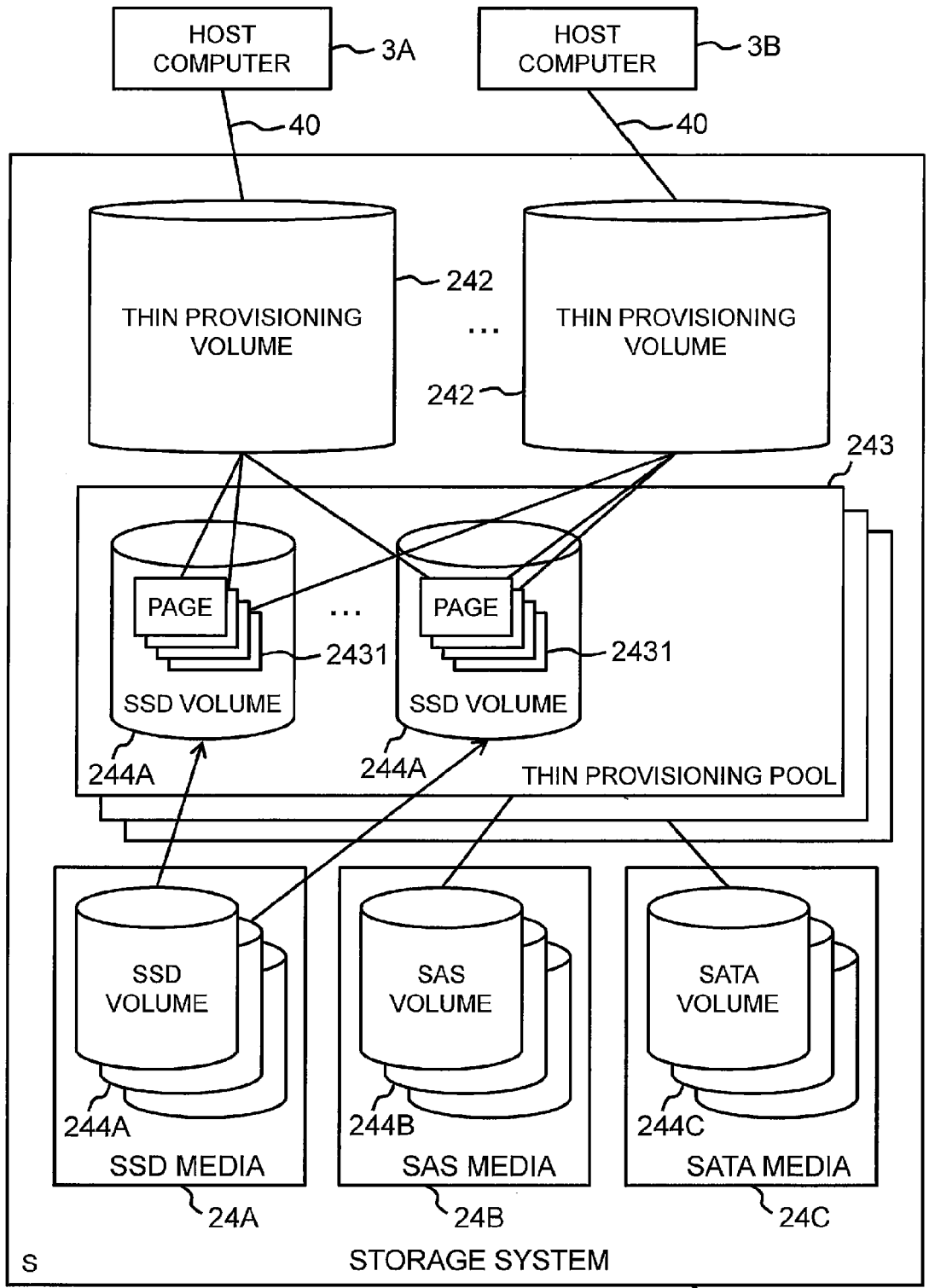
FIG. 6 is a diagram showing an example of a volume configuration of the storage system related to the embodiment.

FIG. 6 is a diagram showing an example of the volume configuration of the storage system related to the embodiment.

In the embodiment, a volume provided by the storage system 2 is a thin provisioning volume (a virtual logical volume) 242. A thin provisioning pool 243 is configured using multiple volumes 244 based on a group of nonvolatile storage devices (for example, a RAID group) having different performance (access performance). Hereinafter, a volume 244 serving as a component of the pool 243 will be referred to as a pool volume 244. The pool volume 244 is partitioned into multiple pages 2431. The processor 21 (for example, a data I/O program 2411, which will be explained further below) receives a write request from the host computer 3, allocates a page 2431 from the pool 243 to a write destination conforming to this write request (the write destination in the thin provisioning volume 242), and writes data conforming to the write request to the allocated page 2431. The multiple volumes 244 having different access performance include an SSD volume (a logical volume based on a SSD group) 244A, a SAS volume (a logical volume based on a SAS-HDD group) 244B, and a SATA volume (a logical volume based on a SATA-HDD group) 244C. In the following explanation, a case, which simply refers to "volume", may signify a thin provisioning volume 242.

The processor 21 (for example, a pool management program 2412, which will be explained further below) migrates data from one page 2431 to another page 2431 based on the access status (the access status of a page 2431 (real page) allocated to a virtual page) of each area (virtual page) in the volume 242, and allocates the other page 2431 to the allocation-destination virtual page of the one page 2431 instead of the one page 2431. For example, in a case where the performance (for example, an allowable access frequency range) of a nonvolatile storage device constituting the basis of the page 2431 is not suitable for the access status (for example, the access frequency) of the page 2431 (for example, in a case where this access frequency is outside the allowable access frequency), the data in the page 2431 is migrated to a page based on a non-volatile storage device with performance suitable to this access status.

Figure 7:
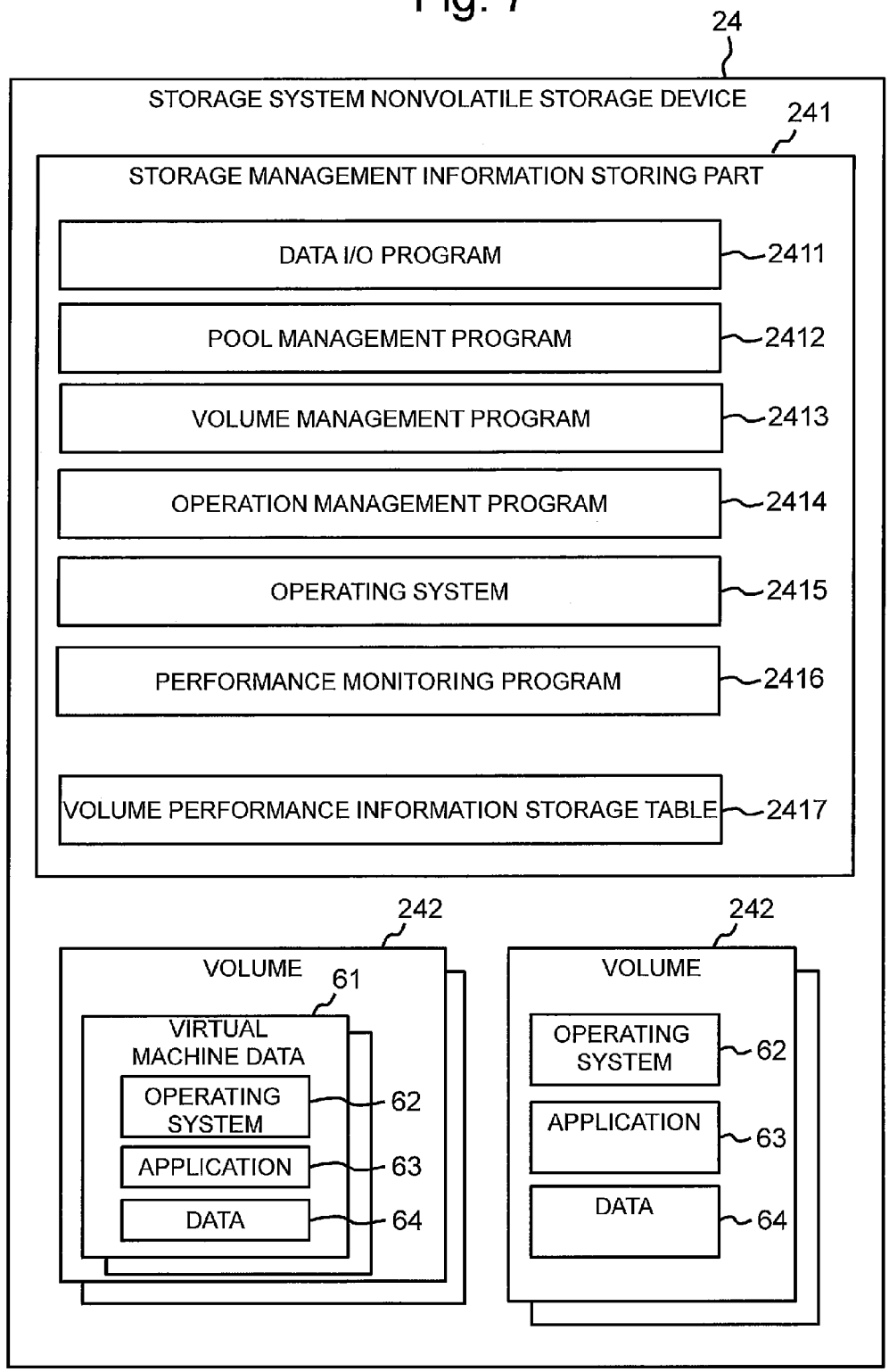
FIG. 7 is a diagram showing an example of the internal configuration of a non-volatile storage device in the storage system related to the embodiment.

FIG. 7 is a diagram of an example of the internal configuration of a nonvolatile storage device in the storage system related to the embodiment.

A storage area of the nonvolatile storage device 24 of the storage system 2 is allocated to a storage management information storage part 241 and a volume 242. The storage management information storage part 241 stores a data I/O program 2411, a pool management program 2412, a volume management program 2413, an operation management program 2414, an operating system 2415, a performance monitoring program 2416, and a volume performance information storage table 2417.

The data I/O program 2411 is for controlling the input/output of user data to/from the volume 242. The pool management program 2412 is for managing a pool (in the embodiment, the thin provisioning pool 243) of storage areas allocated to the volume 242. The volume management program 2413 is for managing the volume 242. The operation management program 2414 is for managing the overall operation of the storage system 2. The operating system 2415 is a basic program for running the other programs, that is, the data I/O program 2411, the pool management program 2412, the volume management program 2413, the operation management program 2414, and the performance monitoring program 2416 on the storage system 2. The performance monitoring program 2416 is for monitoring the performance inside the storage system 2, for example, the I/O performance with respect to the volume 242. The volume performance information storage table 2417 will be explained further below.

The volume 242 stores virtual machine data 61, which is image data used when the management computer 1 deploys the virtual machine 6. The virtual machine data 61 comprises an operating system 62, an application 63, and data 64.

Figure 8:
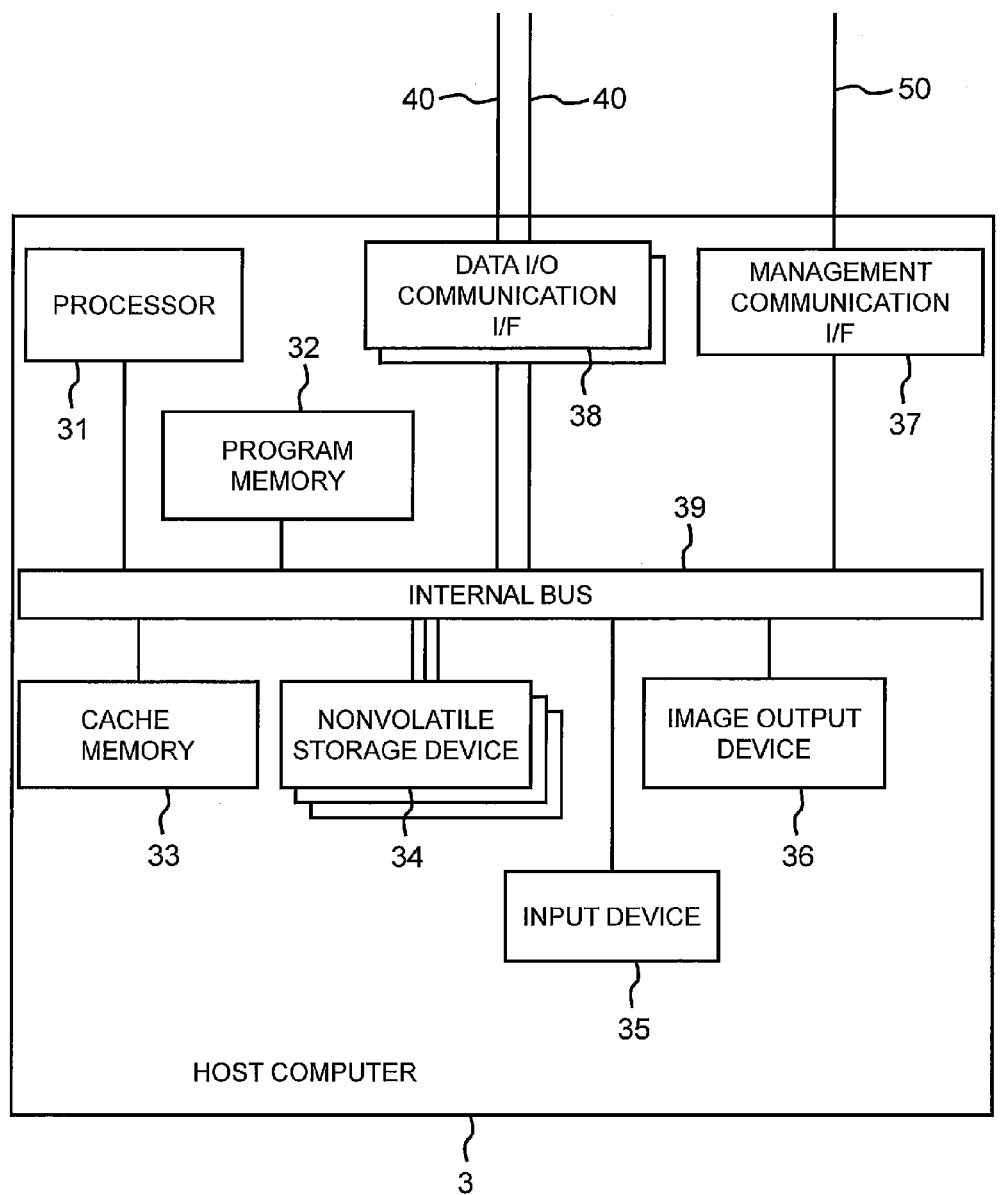
FIG. 8 is a block diagram of an example of a host computer related to the embodiment.

FIG. 8 is a block diagram of an example of a host computer related to the embodiment.

The host computer 3 functions as a server, which executes a server program and provides a prescribed network service, for example, a Web service, an application service, or a database (DB) provision service (hereinafter, referred to as "DB service"), to a user via a communication network. The host computer 3 can function as a physical server, and can also function as a virtual server in accordance with running a virtual machine. The host computer 3 may be called a "server" hereinbelow. The host computer 3 comprises a processor 31, a program memory 32, a cache memory 33, one or more nonvolatile storage devices 34, an input device 35, an image output device 36, a management I/F (management communication I/F) 37, one or more data I/Fs (data I/O communication I/F) 38, and an internal bus 39. The processor 31, the program memory 32, the cache memory 33, the nonvolatile storage device(s) 34, the input device 35, the image output device 36, the management I/F 37, and the data I/F(s) 38 are coupled together via the internal bus 39. The processor 31 executes various types of programs loaded into the program memory 32 from the nonvolatile storage device 34. The nonvolatile storage device 34 may be a memory, a secondary storage device, such as a hard disk drive (HDD), or a combination of a memory and a secondary storage device. The management I/F 37 is an interface device for connecting to the LAN 50, and is used primarily when inputting and outputting management data. The data I/F 38 is an interface device for connecting to the SAN 40, and is used primarily when inputting and outputting user data.

Figure 9:
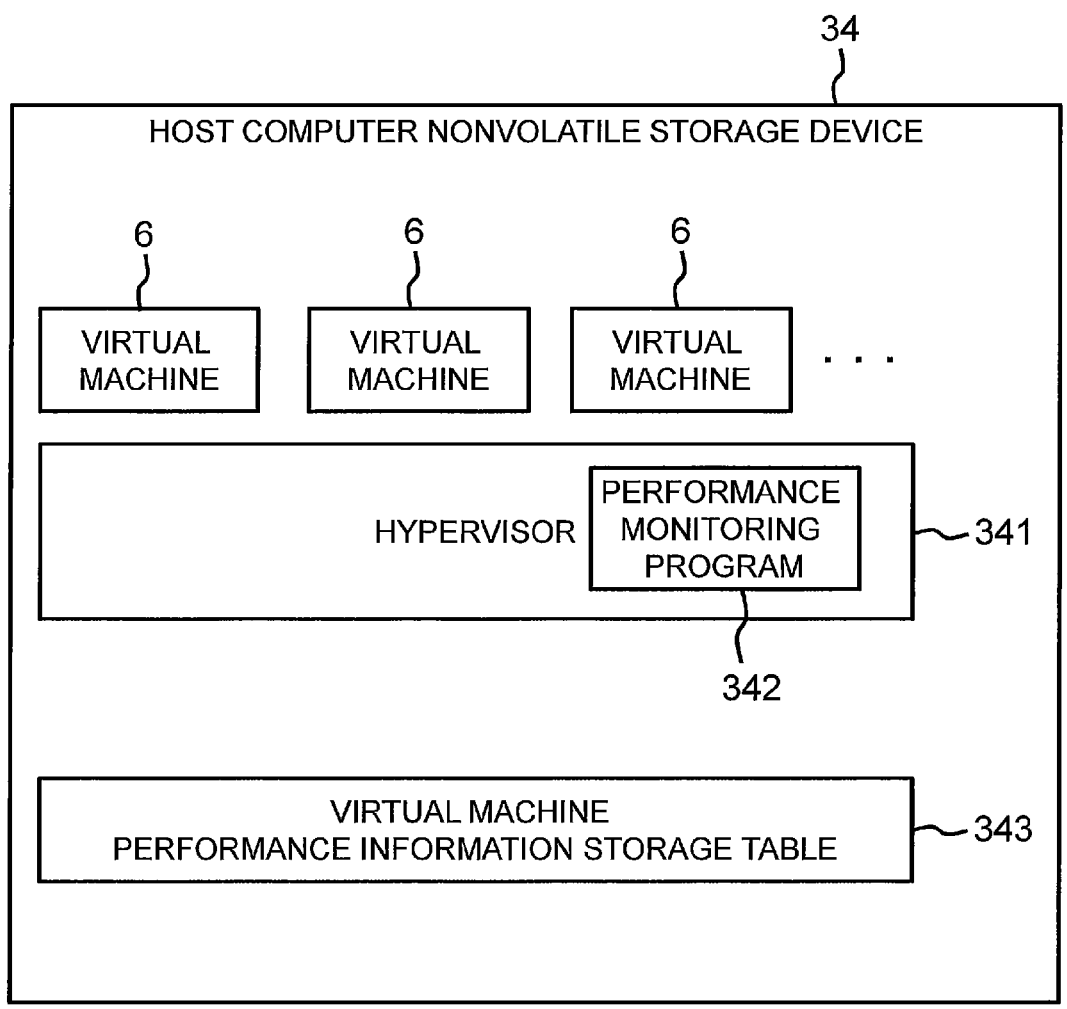
FIG. 9 is a diagram showing a first example of the internal configuration of a nonvolatile storage device in the host computer related to the embodiment.

FIG. 9 is a diagram showing a first example of the internal configuration of a non-volatile storage device of the host computer related to the embodiment.

This diagram shows the internal configuration of the nonvolatile storage device 34 in a case where the host computer 3 functions as a virtual server. The nonvolatile storage device 34 of the host computer 3 stores a hypervisor 341 comprising a performance monitoring program 342 and a virtual machine performance information storage table 343. The hypervisor 341 is a program for running the virtual machine 6. One or more virtual machines 6 are created on the hypervisor 341. Each virtual machine 6 executes a server program, and provides a prescribed network service to the user. The virtual machine performance information storage table 343 will be explained further below.

Figure 10:
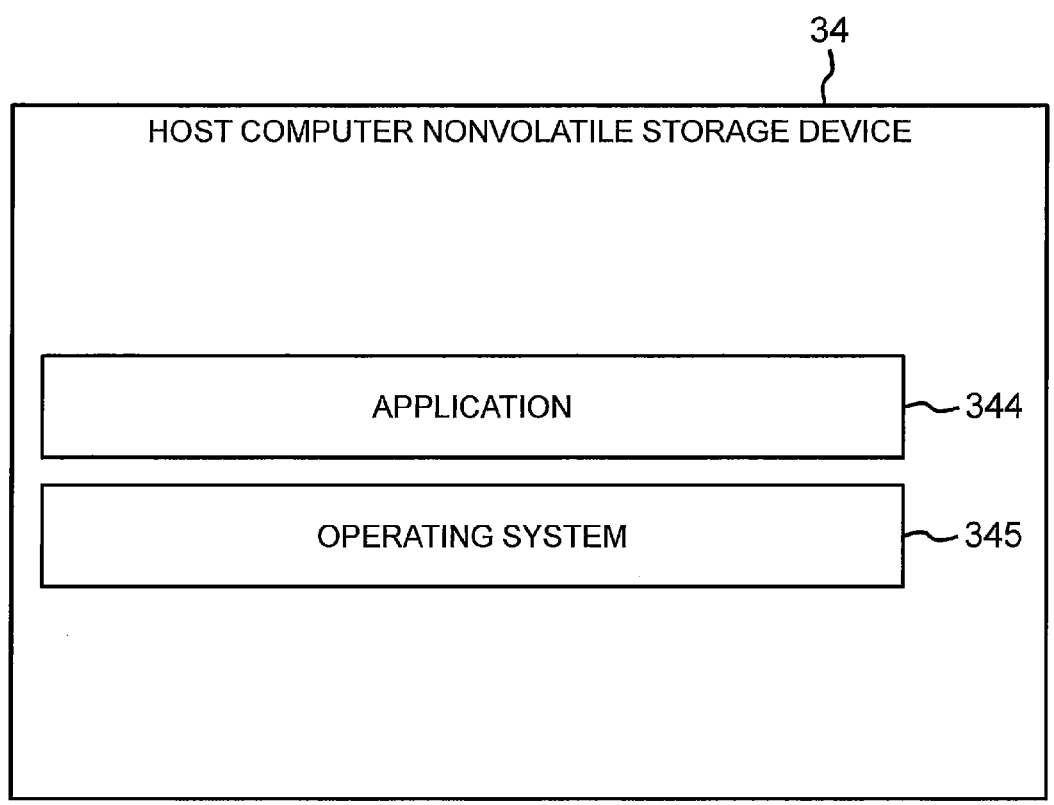
FIG. 10 is a diagram showing a second example of the internal configuration of a nonvolatile storage device in the host computer related to the embodiment.

FIG. 10 is a diagram showing a second example of the internal configuration of a nonvolatile storage device of the host computer related to the embodiment.

This diagram shows the internal configuration of the nonvolatile storage device 34 in a case where the host computer 3 functions as a physical server. The nonvolatile storage device 34 of the host computer 3 stores an application 344, which is equivalent to a server program, and an operating system 345, which is a basic program for running the application 344.

Figure 11:
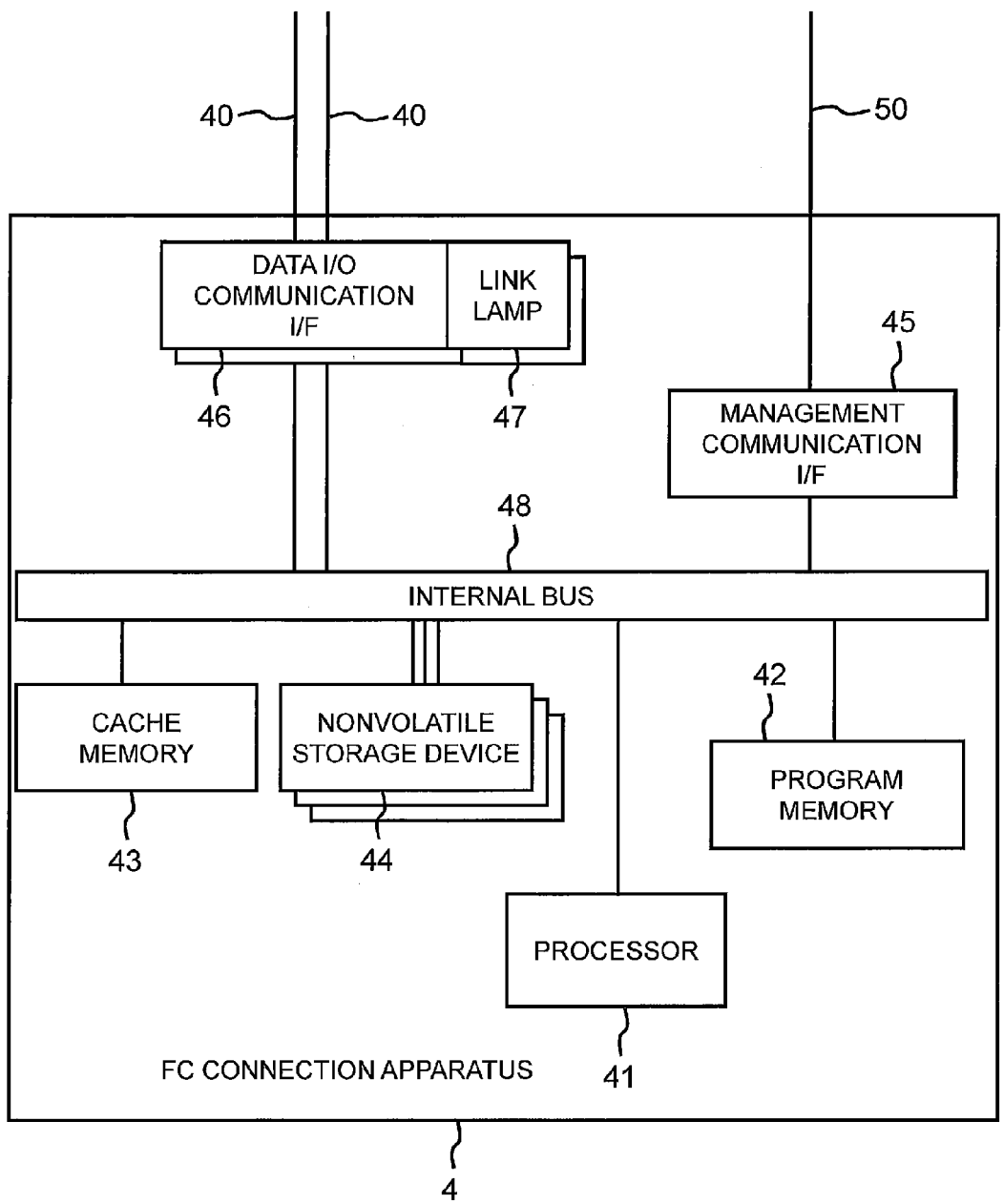
FIG. 11 is a block diagram of an example of a FC connection apparatus related to the embodiment.

FIG. 11 is a block diagram of an example of the FC connection apparatus related to the embodiment.

The FC connection apparatus 4, for example, is an FC switch. The FC connection apparatus 4 comprises a processor 41, a program memory 42, a cache memory 43, one or more nonvolatile storage devices 44, a management I/F (management communication I/F) 45, one or more data I/Fs (data I/O communication I/F) 46, a link lamp 47 which is coupled to each data I/F 46, and an internal bus 48. The processor 41, the program memory 42, the cache memory 43, the nonvolatile storage device(s) 44, the management I/F 45, and the data I/F(s) 46 are coupled together via the internal bus 48. The processor 41 executes various types of programs loaded into the program memory 42 from the nonvolatile storage device 44. The management I/F 45 is an interface device for connecting to the LAN 50, and is used primarily when inputting and outputting management data. The data I/F 46 is an interface device for connecting to the SAN 40, and is used primarily when inputting and outputting user data.

Figure 12:
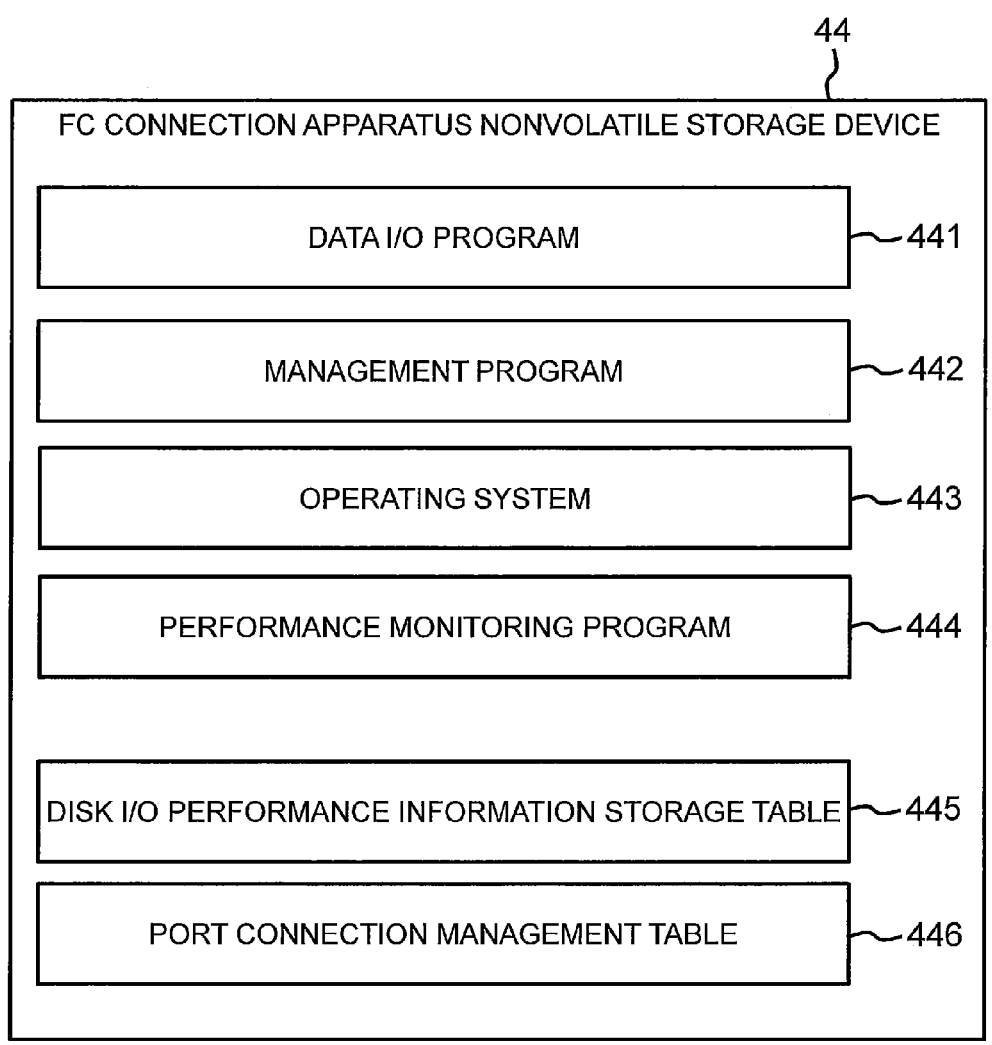
FIG. 12 is a diagram showing an example of the internal configuration of a non-volatile storage device in the FC connection apparatus related to the embodiment.

FIG. 12 is a diagram showing an example of the internal configuration of the non-volatile storage device of the FC connection apparatus related to the embodiment.

The nonvolatile storage device 44 of the FC connection apparatus 4 stores a data I/O program 441, a management program 442, an operating system 443, a performance monitoring program 444, a Disk I/O performance information storage table 445, and a port connection management table 446.

The data I/O program 441 is for controlling the input/output of user data to/from the FC connection apparatus 4. The management program 442 is for managing the FC connection apparatus 4. The operating system 443 is a basic program for running the other programs, that is, the data I/O program 441, the management program 442, and the performance monitoring program 444 on the FC connection apparatus 4. The performance monitoring program 444 is for monitoring the I/O performance from the server to the volume 242. The Disk I/O performance information storage table 445 and the port connection management table 446 will be explained further below.

Figure 13:
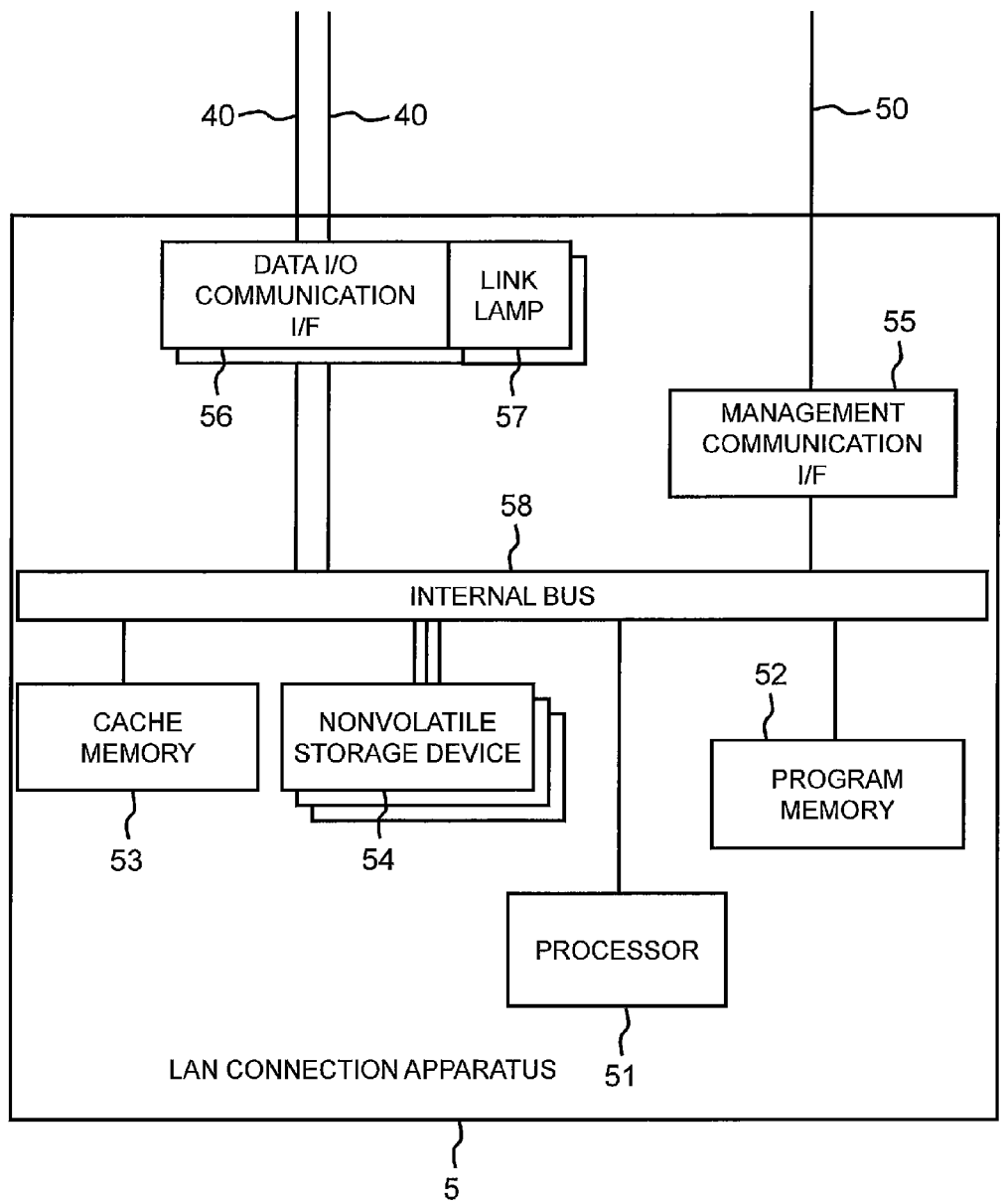
FIG. 13 is a block diagram of an example of a LAN connection apparatus related to the embodiment.

FIG. 13 is a block diagram of an example of the LAN connection apparatus related to the embodiment.

The LAN connection apparatus 5, for example, is an IP switch and router. The LAN connection apparatus 5 comprises a processor 51, a program memory 52, a cache memory 53, one or more nonvolatile storage devices 54, a management I/F (management communication I/F) 55, one or more data I/Fs (data I/O communication I/F) 56, one or more link lamps 57, and an internal bus 58. The processor 51, the program memory 52, the cache memory 53, the nonvolatile storage device(s) 54, the management I/F 55, and the data I/F(s) 56 are coupled together via the internal bus 58. The processor 51 executes various types of programs loaded into the program memory 52 from the nonvolatile storage device 54. The management I/F 55 is an interface device for connecting to the LAN 50, and is used primarily when inputting and outputting management data. The data I/F 56 is an interface device for connecting to a communication line inside the LAN 50, and is used primarily when inputting and outputting data (including user data), which is sent and received between the host computer 3 and the computer used by the user to receive the provision of a network service.

Figure 14:
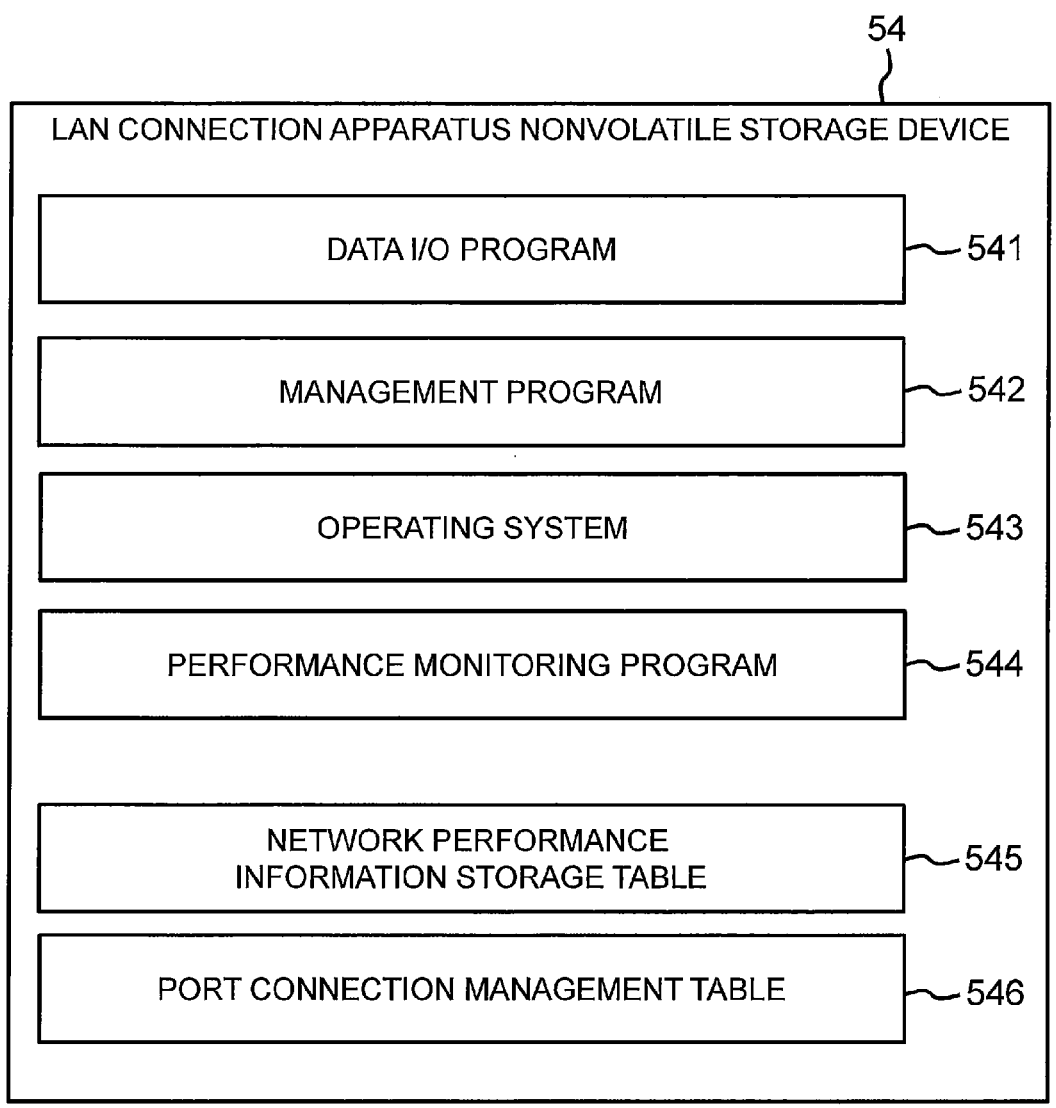
FIG. 14 is a diagram showing an example of the internal configuration of a non-volatile storage device in the LAN connection apparatus related to the embodiment.

FIG. 14 is a diagram showing an example of the internal configuration of the non-volatile storage device of the LAN connection apparatus related to the embodiment.

The nonvolatile storage device 54 of the LAN connection apparatus 5 stores a data I/O program 541, a management program 542, an operating system 543, a performance monitoring program 544, a network performance information storage table 545, and a port connection management table 546.

The data I/O program 541 is for controlling the input/output of user data to/from the LAN connection apparatus 5. The management program 542 is for managing the LAN connection apparatus 5. The operating system 543 is a basic program for running the other programs, that is, the data I/O program 541, the management program 542, and the performance monitoring program 544 on the LAN connection apparatus 5. The performance monitoring program 544 is for monitoring the I/O performance from the server to the LAN 50. The network performance information storage table 545 and the port connection management table 546 will be explained further below.

Next, the various types of information stored in the non-volatile storage device 14 of the management computer 1 will be explained.

FIG. 15A is a block diagram of a first example of a service template related to the embodiment. FIG. 15B is a block diagram of a second example of a service template related to the embodiment. FIG. 15C is a block diagram of a third example of a service template related to the embodiment.

The service template 1406 is data comprising information related to a combination of one or more computer system 100-providable server machines (hereinafter referred to as "machine group") (a resource group), which have been grouped together. The one or more server machines comprising a machine group are provided all together to the tenant administrator as a set. A service template 1406 is created for each machine group as shown in FIGS. 15A, 15B and 15C. The service template 1406 comprises information related to each of the one or more server machines comprising the machine group. The service template 1406 comprises data showing the application of each of the one or more server machines comprising the machine group.

The management computer 1, based on the service template 1406, creates catalog data for providing the tenant administrator with the contents of each machine group, that is, the contents of each of the one or more server machines comprising each machine group. The application of the server machine is included in the server machine content shown by the catalog data. The tenant administrator, based on the provided catalog data, is able to select a machine group for use in a business service, that is, for receiving provisioning. Thus, the tenant administrator can select a machine group for an application best suited to a business service. In the embodiment, the business service provided by the tenant administrator is a service combining one or more network services. The tenant administrator is able to select a machine group, which is a combination of server machines for applications best suited to each of the one or more network services comprising the business service. The management computer 1 may provide the tenant administrator with the contents of the service template 1406 as catalog data as-is. In the embodiment, the management computer 1 provides the tenant administrator with the contents of the service template 1406 and a service template list 1407, which will be explained further below (refer to FIG. 16), as catalog data.

The service template 1406, for example, comprises a table, and includes the fields of image 1406a, virtual/physical 1406b, CPU 1406c, memory 1406d, number of deploying units 1406e, disk 1406f, NW I/O response threshold 1406g, Disk I/O response threshold 1406h, CPU utilization threshold 1406i, and memory usage threshold 1406j. The service template 1406 also comprises an entry 1406y related to each of the one or more server machines comprising the machine group, and an entry 1406z related to the machine group as a whole. The data stored in each of the fields 1406a through 1406j of the entry 1406y related to the server machines will be explained below.

A name of a server machine image data used when the management computer 1 deploys a server machine, for example, the name of the virtual machine data 61 in a case where the server machine is a virtual machine 6, is stored in the image 1406a. In the embodiment, the name of the server machine image data indicates the application of the server machine. For example, the "Web1.ovf" of this diagram shows that the server machine application is a Web service. The "App1.ovf" shows that the server machine application is an application service. The "DB1.ovf" shows that the server machine application is a DB service.

Data showing whether the server machine is a virtual machine 6 or a physical machine is stored in the virtual/physical 1406b. A CPU performance value (specifically, a number of clocks) allocated to the server machine is stored in the CPU 1406c. A memory size allocated to the server machine is stored in the memory 1406d. The number of host computers 3 used to deploy the server machine is stored in the number of deploying units 1406e. The volume 242 allocated to the server machine, that is, the capacity and type of the volume 242 capable of being used by the server machine is stored in the disk 1406f. Here, the type of volume 242 allocated to the server machine corresponds to the type of volume 244 on the media, which constitutes the basis of the volume 242 allocated to the server machine. The type of the volume 242 allocated to the server machine shows the grade of the server machine. For example, a server machine, which is allocated with a volume 242 created on the basis of SSD media 24A, is high grade because the access speed of the volume 242 is high speed. A server machine, which is allocated with a volume 242 created on the basis of SAS media 24B, is middle grade because the access speed of the volume 242 is medium speed. A server machine, which is allocated with a volume 242 created on the basis of SATA media 24C, is low grade because the access speed of the volume 242 is low speed.

The fields 1406g through 1406j are fields with respect to management computer 1-monitorable measurement values (hereinafter "performance measurement value") related to the performance of a process executed in the server machine, that is, the processing performance of a server program for providing a network service, and are for storing thresholds (hereinafter, "performance threshold") for determining whether or not the performance measurement value is normal.

The performance measurement values, for example, include a measurement value related to the network I/O of processing executed on the server machine, that is, I/O with respect to the LAN 50 (for example, the response time, bandwidth, frequency, and so forth of network I/O), a measurement value related to the disk I/O of the processing executed on the server machine, that is, I/O with respect to the volume 242 (for example, the response time, bandwidth, frequency, and so forth of the disk I/O), a measurement value related to the CPU allocated to the server machine (for example, the CPU utilization), and a measurement value related to the memory allocated to the server machine (for example, the memory usage, the maximum memory usage, the basic size and so forth). The management computer 1 can acquire a performance measurement value for a server machine, which is a virtual machine 6, from the hypervisor 341 running the server machine. Alternatively, the management computer 1 can acquire a performance measurement value for a server machine, which is a physical machine, from the LAN connection apparatus 5, the FC connection apparatus 4, or the storage system 2. Specifically, the management computer 1 can acquire a network I/O-related measurement value from the LAN connection apparatus 5, and can acquire a disk I/O-related measurement value from the FC connection apparatus 4 or the storage system 2. Incidentally, in a case where the server machine is a virtual machine 6, the virtual machine 6 belongs to the tenant administrator's management area, and parts other than the server virtual machine 6, such as the hypervisor 341, belong to the DC administrator's management area. Therefore, the management computer 1 can acquire information related to the hypervisor 341 virtual machine 6 from the hypervisor 341.

A performance threshold for a measurement value related to the network I/O of processing executed on the server machine (in this embodiment, the network I/O response time) is stored in the NW I/O response threshold 1406g. A performance threshold for a measurement value (in this embodiment, the disk I/O response time) related to the disk I/O of processing executed on the server machine is stored in the Disk I/O response threshold 1406h. A performance threshold for a measurement value (in this embodiment, CPU utilization) related to the CPU allocated to the server machine is stored in the CPU utilization threshold 1406i. A performance threshold for a measurement value (in this embodiment, memory usage) related to the memory allocated to the server machine is stored in the memory usage threshold 1406j.

The respective performance thresholds stored in the fields 1406g through 1406j, for example, are configured based on the server machine application and grade. For example, in the case of a Web service, since the amount of data sent and received between the computer used by the user and the server providing the Web service, that is, the amount of network I/O, is high, network I/O response performance is considered important. Alternatively, the amount of accessing with respect to the volume 242 done by the server providing the Web service, that is, the amount of disk I/O, is not all that high. Therefore, the DC administrator, for example, can configure as low the performance threshold for the performance measurement value related to the network I/O (the network I/O response time) of the Web service-application server machine, that is, can configure the performance requirement rather tightly, and can configure as high the performance threshold for the performance measurement value related to the disk I/O (the disk I/O response time), that is, can configure the performance requirement rather loosely. In the case of a DB service, since the amount of accessing with respect to the volume 242 done by the server providing the DB service, that is, the amount of disk I/O, is high, the disk I/O response time is considered important. Therefore, the DC administrator, for example, can configure as low the performance threshold for the performance measurement value related to the disk I/O (the disk I/O response time) of the DB service-application server machine. In the case of an application service, the amount of network I/O and the amount of disk I/O are considered to fall somewhere between the amount of I/O in the case of the Web service and the amount of I/O in the case of the DB service. Therefore, the DC administrator, for example, can configure the performance threshold for the application service-application server machine to a value that falls between the performance threshold in the case of the Web service and the performance threshold in the case of the DB service. The DC administrator, for example, can also configure as low the performance threshold for the performance measurement value related to the disk I/O (the disk I/O response time) for a high-grade server machine, and can configure as high the performance threshold for the performance measurement value related to the disk I/O (the disk I/O response time) for a low-grade server machine.

A performance threshold related to the machine group as a whole is stored in the fields 1406g through 1406j for the entry 1406z related to the machine group as a whole. Here, the performance threshold related to the machine group as a whole refers to the performance thresholds related to business processing of a business service, which uses a machine group, that is, to the processing of all of the one or more server programs for providing one or more network services comprising the business service. Specifically, a performance threshold for a measurement value related to the network I/O of business processing (in the embodiment, the network I/O response time) is stored in the NW I/O response threshold 1406g of the entry 1406z. A performance threshold for a measurement value related to the disk I/O of business processing (in the embodiment, the disk I/O response time) is stored in the Disk I/O response threshold 1406h of the entry 1406z. A performance threshold for a measurement value related to the CPU allocated for business processing (in the embodiment, the CPU utilization) is stored in the CPU utilization threshold 1406i of the entry 1406z. A performance threshold for a measurement value related to the memory allocated for business processing (in the embodiment, the memory usage) is stored in the memory usage threshold 1406j of the entry 1406z.

For example, the service template 1406 of FIG. 15A (service template A) shows a machine group comprising three server machines, that is, server machines with the respective image data names of "Web1.ovf", "App1.ovf", and "DB1.ovf". By referencing this service template A, the tenant administrator can learn that the machine group shown in service template A is suited for use in a business service, which is a combination of a Web service, an application service, and a DB service. The tenant administrator can also learn the specifications of each server machine.

FIG. 16 is a block diagram of an example of a service template list related to the embodiment.

The service template list 1407 is data listing the names of service templates 1406, which show information related thereto for one or more machine groups capable of being provided by the computer system 100. The service template list 1407, for example, is configured using a table, and comprises fields of a number (written as "#" in the drawing) 1407a, a service template name 1407b, application 1407c, and quality 1407d. A list of numbers is stored in the number 1407a. The names of the service templates 1406 are stored in the serviced template name 1407b. The intended use of an application deployed by a service template is described in application 1407c, and the quality of the application is described in quality 1407d. By referencing the service template list 1407, the tenant administrator can learn the name of a service template 1406, which shows information related thereto for one or more selectable machine groups.

FIG. 17 is a block diagram of an example of a machine management table related to the embodiment.

The machine management table 1408 is for managing information related to a server machine running on the computer system 100. The machine management table 1408 comprises the fields of machine name 1408a, configuration 1408b, Hypervisor 1408c, and Datastore 1408d. The name of a server machine is stored in the machine name 1408a. Data showing whether a server machine is a virtual machine 6 or a physical machine is stored in the configuration 1408b. An identifier of a server (a host computer 3) comprising a hypervisor 341, which is running on the server machine, is stored in the Hypervisor 1408c. An identifier of a volume 242 allocated to the server machine is stored in the Datastore 1408d. For example, based on the first entry from the top of FIG. 17, it is clear that a virtual machine 6 named "WebVM1" is running on the server "Sv1", and that the volume "Vol1" is allocated to the virtual machine 6.

FIG. 18 is a block diagram of an example of a machine group management table related to the embodiment.

The machine group management table 1409 is for managing information related to a machine group, which is provided to a tenant administrator. The machine group management table 1409 comprises the fields of Group 1409a, VM name

1409*b*, NW I/O response threshold 1409*c*, Disk I/O response threshold 1409*d*, CPU utilization threshold 1409*e*, memory usage threshold 1409*f*, and status 1409*g*. The machine group management table 1409 stores two types of entries, i.e., an entry 1409*y* related to a server machine included in a machine group, and an entry 1409*z* related to a machine group as a whole. A machine group identifier is stored in the Group 1409*a*. In the VM name 1409*b*, the name of a server machine included in the machine group is stored in the entry 1409*y*, and data indicating the machine group as a whole (the "entire group" in the example of FIG. 18) is stored in the entry 1409*z*.

The fields 1409*c* through 1409*f* are for storing performance thresholds. The performance thresholds related to a server machine included in the machine group are stored in fields 1409*c* through 1409*f* with respect to the entry 1409*y* related to the server machine included in the machine group. Specifically, a performance threshold for a measurement value related to the network I/O of processing executed on the server machine (in this embodiment, the network I/O response time) is stored in the NW I/O response threshold 1409*c*. A performance threshold for a measurement value related to the disk I/O of processing executed on the server machine (in this embodiment, the disk I/O response time) is stored in the Disk I/O response threshold 1409*d*. A performance threshold for a measurement value related to the CPU allocated to the server machine (in this embodiment, CPU utilization) is stored in the CPU utilization threshold 1409*e*. A performance threshold for a measurement value related to the memory allocated to the server machine (in this embodiment, memory usage) is stored in the memory usage threshold 1409*f*. Alternatively, a performance threshold related to the machine group as a whole is stored in the fields 1409*c* through 1409*f* for the entry 1409*z* related to the machine group as a whole. Specifically, a performance threshold for a measurement value related to the network I/O of business processing (the network I/O response time) is stored in the NW I/O response threshold 1409*c*. A performance threshold for a measurement value related to the disk I/O of business processing (the disk I/O response time) is stored in the Disk I/O response threshold 1409*d*. A performance threshold for a measurement value related to the CPU allocated for business processing (CPU utilization) is stored in the CPU utilization threshold 1409*e*. A performance threshold for a measurement value related to the memory allocated for business processing (memory usage) is stored in the memory usage threshold 1409*f*.

In the status 1409*g* of the entry 1409*y* related to a server machine included in the machine group, data showing whether or not the performance measurement value acquired for this server machine is normal. In the status 1409*g* of the entry 1409*z* related to the machine group as a whole, data showing whether or not the performance measurement value acquired for this machine group as a whole is normal. For example, in a case where any of the performance measurement values corresponding to the respective performance thresholds stored in the fields 1409*c* through 1409*f* is abnormal, that is, a case in which the performance measurement value exceeds the corresponding performance threshold, data indicating that the performance measurement value is abnormal is stored in the status 1409*g*. Alternatively, in a case where all of the performance measurement values corresponding to the respective performance thresholds stored in the fields 1409*c* through 1409*f* are normal, that is, a case in which the performance measurement value does not exceed the corresponding performance threshold, data indicating that the performance measurement value is normal is stored in the status 1409*g*. The performance measurement value corresponding to the performance threshold is the performance measurement value determined based on this performance threshold. A determination as to whether or not a performance measurement value is normal, for example, may be made based on whether or not the time period during which the performance measurement value has exceeded the corresponding performance threshold is equal to or longer than a prescribed time period rather than whether or not the performance measurement value exceeds the corresponding performance threshold.

FIG. 19A is a block diagram of a first example of a machine performance management table related to the embodiment. FIG. 19B is a block diagram of a second example of a machine performance management table related to the embodiment.

The machine performance management table 1410 is for managing a performance measurement value acquired for a server machine running on the computer system 100. The machine performance management table 1410, for example, is created for each server machine running on the computer system 100. The machine performance management table 1410 in a case where the server machine is a virtual machine 6 comprises the fields of Time 1410*a*, NW I/O response 1410*b*, Disk I/O response 1410*c*, CPU utilization 1410*d*, and memory usage 1410*e* as in the machine performance management table 1410 related to the server machine "Web VM1" shown in FIG. 19A.

The machine performance management table 1410 in a case where the server machine is a physical machine comprises the fields of Time 1410*a*, NW I/O response 1410*b*, and Disk I/O response 1410*c* as in the machine performance management table 1410 related to the server machine "DB PM2" shown in FIG. 19B.

The time at which the acquired performance measurement value was measured is stored in the Time 1410*a*. The fields 1410*b* through 1401*e* are for storing the performance measurement values acquired for a server machine. Specifically, a measurement value related to the network I/O of processing executed on the server machine (the network I/O response time) is stored in the NW I/O response 1410*b*. A measurement value related to the disk I/O of processing executed on the server machine (the disk I/O response time) is stored in the Disk I/O response 1410*c*. A measurement value related to the CPU allocated to the server machine (CPU utilization) is stored in the CPU utilization 1410*d*. A measurement value related to the memory allocated to the server machine (memory usage) is stored in the memory usage 1410*e*.

FIG. 20 is a block diagram of an example of a server management table related to the embodiment.

The server management table 1411 is for managing a server inside the computer system 100. The server management table 1411 comprises the fields of server name 1411*a*, virtual/physical 1411*b*, CPU 1411*c*, allocated CPU 1411*d*, memory 1411*e*, and allocated memory 1411*f*. A server identifier is stored in the server name 1411*a*. Data showing whether a server is a virtual server or a physical server (whether the host computer 3, which is the server, functions as a virtual server or a physical server) is stored in the virtual/physical 1411*b*. The performance value (number of clocks) of the CPU of the server, that is, the processor 31 is stored in the CPU 1411*c*. The performance value (number of clocks) of the CPU, which the server has allocated to the server machine, is stored in the allocated CPU 1411*d*. The memory of the server, that is, the size of the cache memory 33, is stored in the memory 1411*e*. The size of the memory, which the server has allocated to the server machine, is stored in the allocated memory 1411*f*. By referencing the server management table 1411, the management computer 1 can learn what performance level CPU and what size memory each server in the computer system 100 comprises, and from that, what performance CPU and what size memory are allocated to the server machine.

FIG. 21 is a block diagram of an example of a storage management table related to the embodiment.

The storage management table 1412 is for managing a volume 242 created in the storage system 2 inside the computer system 100. The storage management table 1412 comprises the fields of volume name 1412a, virtual/physical 1412b, capacity 1412c, allocated capacity 1412d, and accessible server 1412e. A volume 242 identifier is stored in the volume name 1412a. Data, which shows whether a server capable of accessing the volume 242 is a virtual server or a physical server, is stored in the virtual/physical 1412b. The capacity of the entire volume 242 is stored in the capacity 1412c. The portion of the capacity allocated to a server machine from the volume 242 is stored in the allocated capacity 1412d. The identifier of the server capable of accessing the volume 242 is stored in the accessible server 1412e. By referencing the storage management table 1412, the management computer 1 can learn the total capacity and how much of that capacity has been allocated for each volume 242 created in the storage system 2 inside the computer system 100.

Next, a volume performance information storage table 2417, which is stored in the nonvolatile storage device 24 of the storage system 2, will be explained.

FIG. 22A is a block diagram of a first example of a volume performance information storage table related to the embodiment. FIG. 22B is a block diagram of a second example of the volume performance information storage table related to the embodiment. FIG. 22A is the volume performance information storage table 2417 related to the volume "Vol1", and FIG. 22B is the volume performance information storage table 2417 related to the volume "Vol2".

The volume performance information storage table 2417 is for managing a measurement value related to the disk I/O for a volume, which has been measured with respect to a volume 242 inside the storage system 2 storing the relevant volume performance information storage table 2417 (hereinafter, referred to as the "target volume" in the explanation of FIG. 22). The relevant volume performance information storage table 2417 is produced for, for example, each target volume. The volume performance information storage table 2417 comprises the fields of Time 2417a, IOPS 2417b, and response time 2417c. The time at which the measurement value was measured is stored in the Time 2417a. The IOPS 2417b and the response time 2417c are the fields for storing measurement values related to a target volume disk I/O, which has been measured for the target volume. Specifically, an TOPS (Input Output Per Second) of the I/O with respect to the target volume is stored in the IOPS 2417b. The I/O response time for the target volume is stored in the response time 1417c.

The performance monitoring program 2416 of the storage system 2, either regularly or irregularly (for example, in a case where an I/O has been generated with respect to the target volume), measures a measurement value related to the disk I/O with respect to the target volume (the measurement values stored in the IOPS 2417b and the response time 2417c), and registers an entry related to the measured measurement value in the volume performance information storage table 2417. The measurement value related to the disk I/O with respect to the target volume corresponds to the performance measurement value related to the disk I/O for the server machine, which accesses the target volume, that is, the server machine to which the target volume is allocated. The management computer 1 can acquire the performance measurement value related to the disk I/O for the server machine to which a volume 242 inside the storage system 2 is allocated from the storage system 2.

Next, a virtual machine performance information storage table 343, which is stored in a nonvolatile storage device 34 of a host computer 3 functioning as a virtual server, will be explained in detail.

FIG. 23A is a block diagram of a first example of a virtual machine performance information storage table related to the embodiment. FIG. 23B is a block diagram of a second example of the virtual machine performance information storage table related to the embodiment.

The virtual machine performance information storage table 343 is for managing a performance measurement value measured with respect to a virtual machine 6 (hereinafter referred to as "target machine" in the explanations of FIGS. 23A and 23B), which is running on a server storing the relevant virtual machine performance information storage table 343. The virtual machine performance information storage table 343, for example, is created for each target machine. FIG. 23A shows an example of the virtual machine performance information storage table 343 related to a virtual machine "VM1", and FIG. 23B shows an example of the virtual machine performance information storage table 343 related to a virtual machine "VM2". The virtual machine performance information storage table 343 comprises the fields of Time 343a, NW I/O response 343b, Disk I/O response 343c, CPU utilization 343d, and memory usage 343e.

The time at which a performance measurement value was measured is stored in the Time 343a. NW I/O response 343b through memory usage 343e are fields for storing performance measurement values measured with respect to the target machine. Specifically, a measurement value related to the network I/O of processing executed on the target machine (the network I/O response time) is stored in the NW I/O response 343b. A measurement value related to the disk I/O of processing executed on the target machine (the disk I/O response time) is stored in the Disk I/O response 343c. A measurement value related to the CPU allocated to the target machine (CPU utilization) is stored in the CPU utilization 343d. A measurement value related to the memory allocated to the virtual machine (memory usage) is stored in the memory usage 343e.

The hypervisor 341 of the server (more accurately, the performance monitoring program 342 in the hypervisor 341), either regularly or irregularly (for example, in a case where an I/O has been generated with respect to the volume 242 or the LAN 50), measures a performance measurement value with respect to the target machine (the performance measurement values stored in the NW I/O response 343b through the memory usage 343e), and registers an entry related to the measured performance measurement value in the virtual machine performance information storage table 343. The management computer 1 can acquire the performance measurement value for the target machine running on the server from the server.

Next the various types of information stored in a nonvolatile storage device 44 of the FC connection apparatus 4 will be explained.

FIG. 24 is a block diagram of an example of a Disk I/O performance information storage table related to the embodiment.

The Disk I/O performance information storage table 445 is for managing a disk I/O-related measurement value measured by the FC connection apparatus 4, which stores the relevant Disk I/O performance information storage table 445 (hereinafter, referred to as the "target FC connection apparatus" in the explanation of FIG. 24). The Disk I/O performance information storage table 445, for example, is created for each port of the target FC connection apparatus, that is, for each data I/F 46. The Disk I/O performance information storage table 445 comprises the fields of Time 445a and Disk I/O response 445b. The time at which the measurement value was measured is stored in the Time 445a. A disk I/O-related measurement value measured by the target FC connection apparatus (the disk I/O response time) is stored in the Disk I/O response 445b.

The performance monitoring program 444 of the FC connection apparatus 4, either regularly or irregularly (for example, in a case where an I/O has been generated from a server to a volume 242), measures a measurement value related to the disk I/O for each port (the disk I/O response time), and registers an entry related to the measured measurement value in the Disk I/O performance information storage table 445. The disk I/O-related measurement value measured for each port corresponds to the disk I/O-related performance measurement value measured for the server machine using the corresponding port. The management computer 1 can acquire the performance measurement value related to the disk I/O for the server machine using a port in the FC connection apparatus 4 from the FC connection apparatus 4.

Figure 25:
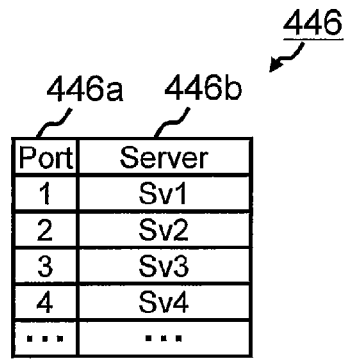
FIG. 25 is a block diagram of an example of a port connection management table of the FC connection apparatus related to the embodiment.

FIG. 25 is a block diagram of an example of a port connection management table of the FC connection apparatus related to the embodiment.

The port connection management table 446 is for managing a server, which is using a port inside the FC connection apparatus 4 storing the relevant port connection management table 446 (hereinafter referred to as "target FC connection apparatus" in the explanation of FIG. 25). The port connection management table 446 comprises the fields of Port 446a and Server 446b. The number of a port of the target FC connection apparatus is stored in the Port 446a. The identifier of the server using the port of the number shown in the Port 446a is stored in the Server 446b. For example, it is clear from the first entry from the top of FIG. 25 that the server "Sv1" is using the first port.

Next the various types of information stored in the non-volatile storage device 54 of the LAN connection apparatus 5 will be explained.

Figure 26:
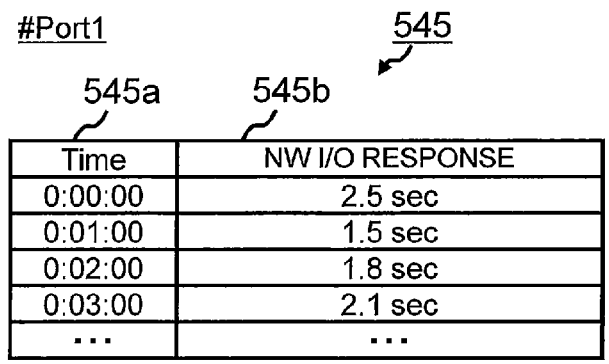
FIG. 26 is a block diagram of an example of a network performance information storage table related to the embodiment.

FIG. 26 is a block diagram of an example of a network performance information storage table related to the embodiment.

The network performance information storage table 545 is for managing a network I/O-related measurement value measured by the LAN connection apparatus 5 storing the relevant network performance information storage table 545 (hereinafter referred to as "target LAN connection apparatus" in the explanation of FIG. 26). The network performance information storage table 545, for example, is created for each port in the target LAN connection apparatus, that is, for each data I/F 56. The network performance information storage table 545 comprises the fields of Time 545a and NW I/O response 545b. The time at which the measurement value was measured is stored in the Time 545a. A network I/O-related measurement value measured by the target LAN connection apparatus (the network I/O response time) is stored in the NW I/O response 545b.

The performance monitoring program 544 of the LAN connection apparatus 5, either regularly or irregularly (for example, in a case where an I/O has been generated from a server to the LAN 50), measures a measurement value related to the network I/O for each port (the network I/O response time), and registers an entry related to the measured measurement value in the network performance information storage table 545. The network I/O-related measurement value measured for each port corresponds to the network I/O-related performance measurement value measured for the server machine, which is using the corresponding port. The management computer 1 can acquire the performance measurement value related to the network I/O for the server machine using a port in the LAN connection apparatus 5 from the LAN connection apparatus 5.

Figure 27:
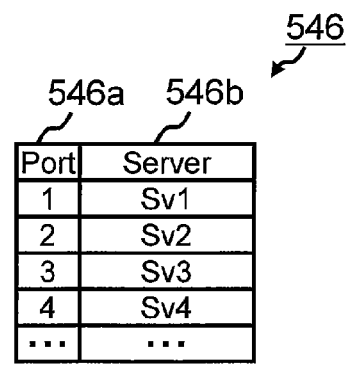
FIG. 27 is a block diagram of an example of a port connection management table of the LAN connection apparatus related to the embodiment.

FIG. 27 is a block diagram of an example of a port connection management table of the LAN connection apparatus related to the embodiment.

The port connection management table 546 is for managing a server, which is using a port inside the LAN connection apparatus 5 storing the relevant port connection management table 546 (hereinafter referred to as "target LAN connection apparatus" in the explanation of FIG. 27). The port connection management table 546 comprises the fields of Port 546a and Server 546b. The number of a port of the target LAN connection apparatus is stored in the Port 546a. The identifier of the server using the port of the number shown in the Port 546a is stored in the Server 546b. For example, it is clear from the first entry from the top of FIG. 27 that the server "Sv1" is using the first port.

Next the operation of the management computer 1 related to the embodiment will be explained.

Figure 28:
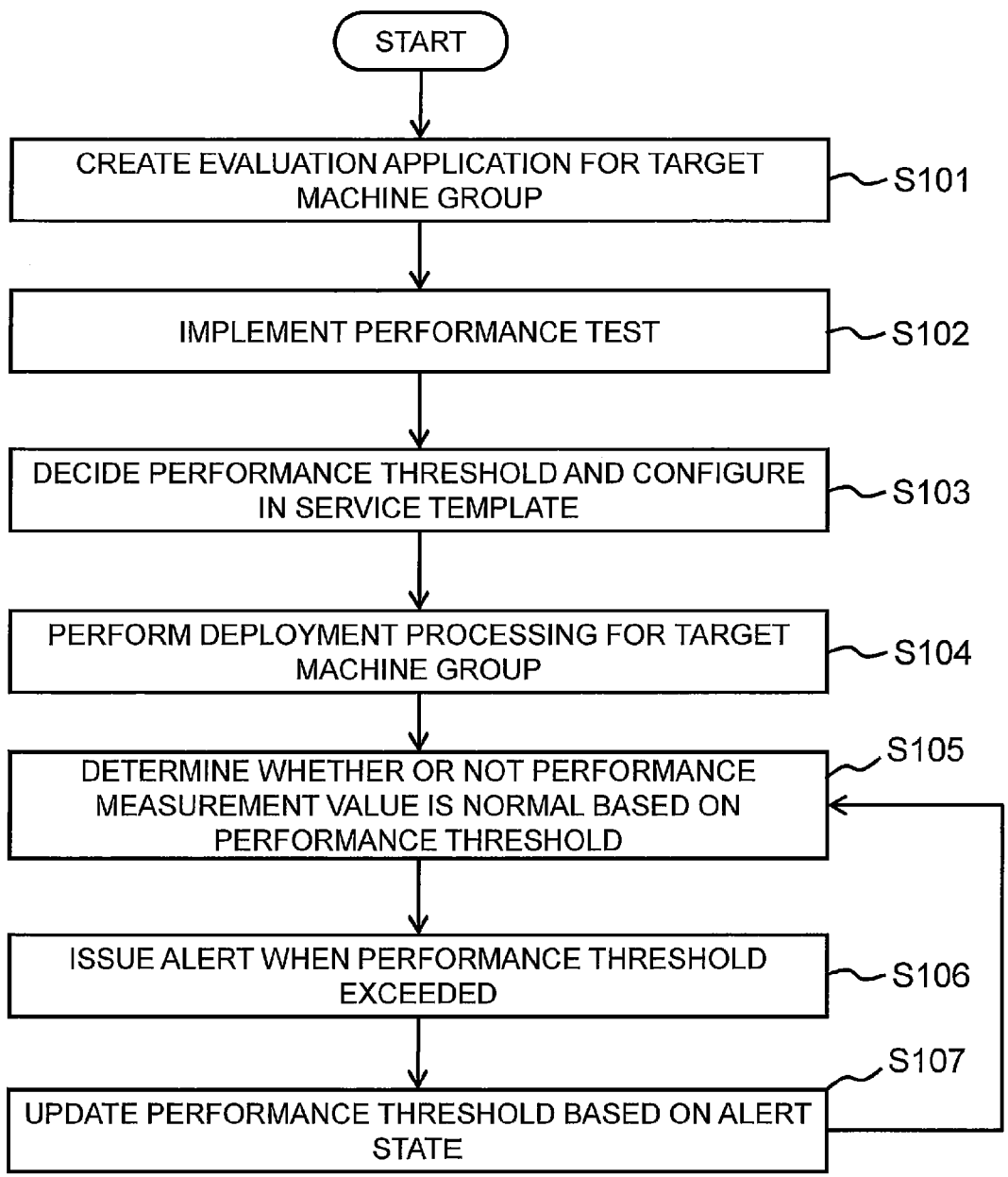
FIG. 28 is a flowchart of a threshold setting/updating process related to the embodiment.

FIG. 28 is a flowchart of a threshold configuring/updating process related to the embodiment.

The threshold configuring/updating process is performed by targeting the respective machine groups capable of being provided by the computer system 100.

First, the DC administrator uses the management computer 1 to create a machine group-using application (hereinafter referred as the "evaluation application") for evaluating a performance threshold related to a server machine included in the machine group with respect to the machine group (hereinafter referred to as the "target machine group" in the explanation of FIG. 28) targeted in the threshold configuring/updating process (Step S101).

Next, the DC administrator implements a performance test for evaluating a performance threshold in accordance with executing the evaluation application created in Step S101 in the targeted machine group (Step S102). Then, the DC administrator uses the management computer 1 to check the performance measurement values (the network I/O response time, the disk I/O response time, the CPU utilization, and the memory usage) of a server machine included in the target machine group in a state in which the evaluation application response time is a fixed value, for example, equal to or larger than a required value. A performance measurement value in a state in which the evaluation application response time is equal to or larger than a fixed value can be used as a reference value for a performance threshold related to a server machine included in the target machine group (a performance threshold with respect to each of the network I/O response time, the disk I/O response time, the CPU utilization, and the memory usage).

Thereafter the DC administrator adjusts the reference value of the performance threshold obtained in Step S102 by taking into account the application of the server machine included in the target machine group, and decides a performance threshold related to the server machine included in the target machine group. The DC administrator also decides the performance threshold related to the target machine group as a whole based on the performance threshold decided in relation to the server machines included in the target machine group. The DC administrator, for example, can total the respective performance thresholds related to the server machines included in the target machine group, and decide on an average value or the like as the performance threshold related to the target machine group as a whole. Then, the DC administrator uses the management computer 1 to store the decided performance thresholds in the fields 1406g through 1406j corresponding to the service template 1406 related to the target machine group (Step S103).

Thereafter, in a case where a tenant administrator target machine group selection is received, the management computer 1 performs deployment processing (refer to FIG. 29) for the target machine group (Step S104). According to the deployment process, the target machine group is usably provided to the tenant administrator, and the tenant administrator can use the target machine group to utilize a business service. The performance thresholds registered in the service template 1406 related to the target machine group are stored in the machine group management table 1409.

Thereafter, the management computer 1 either regularly or irregularly acquires a performance measurement value for a server machine included in the target machine group, and determines whether or not the acquired performance measurement value is normal based on the corresponding performance threshold (Step S105). In a case where the performance measurement value is abnormal, that is, a case in which the performance measurement value exceeds the performance threshold, the management computer 1 notifies the DC administrator with an alert to this effect (Step S106).

The DC administrator adjusts and updates the currently configured performance threshold to a more appropriate performance threshold based on the alert state, that is, the frequency of alert notifications, and whether or not a performance failure is actually occurring in the computer system 100 when the alert is received (Step S107). For example, in a case where the alert notification frequency is too high, the DC administrator may configure the performance threshold higher, that is, such that the requirement with respect to performance is looser. The DC administrator may update only a performance threshold, which is registered in the machine group management table 1409, or may update both a performance threshold registered in the machine group management table 1409 and a performance threshold registered in the service template 1406.

The processing of Step S105 through Step S107 is repeated, and the performance thresholds related to the server machines included in the target machine group are updated to more appropriate values. The configuring and updating of the performance thresholds related to the server machines included in all the machine groups of the computer system 100 is performed in accordance with carrying out the threshold configuring/updating process for each machine group capable of being provided by the computer system 100.

Figure 29:
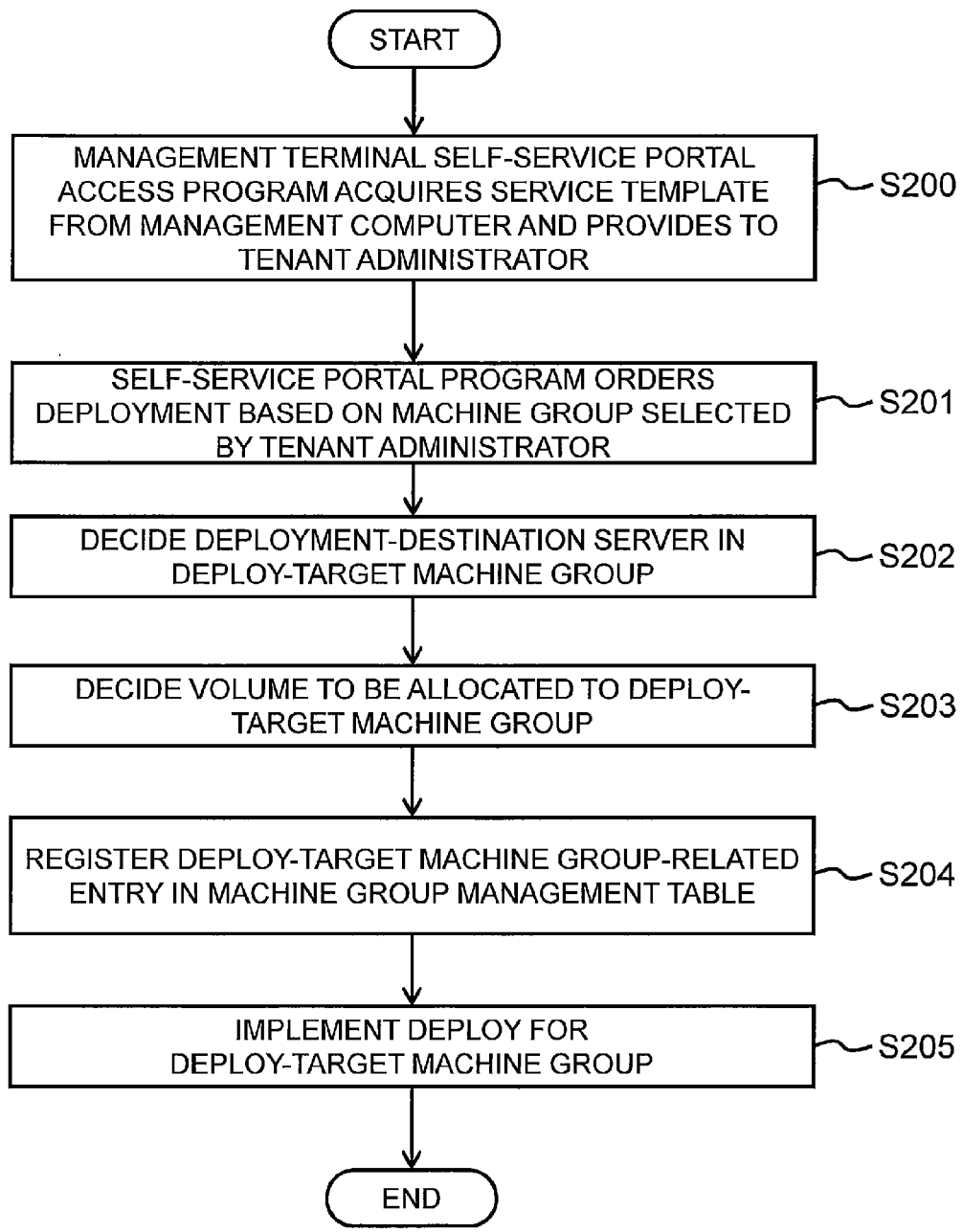
FIG. 29 is a flowchart of a deployment process related to the embodiment.

FIG. 29 is a flowchart of a deployment process related to the embodiment.

The self-service portal program 1401 of the management computer 1, in response to a request sent from a self-service portal access program 7401 of the management terminal 7 operated by the tenant administrator, provides a list of service templates showing the contents of computer system 100-providable machine groups (Step S200). The management terminal 7 uses the image output device 66 to display the received list of service templates in a table to presents this table to the tenant administrator. The presented table, for example, is the table shown in FIG. 16, and comprises at the least application information. Thereafter, the tenant administrator selects (inputs) the machine group to be used via the displayed table, and the self-service portal program 1401 receives the selected machine group to be used. The self-service portal program 1401, in a case where the input device 15-based machine group selection has been received from the tenant administrator, instructs the deployment processing program 1402 of the management computer 1 to deploy the machine group selected by the tenant administrator (hereinafter referred to as the "target machine group" in the explanation of FIG. 29) (Step S201).

The deployment processing program 1402, which has been instructed to deploy the target machine group, references the server management table 1411 and decides the deployment-destination server of the target machine group, more accurately, the deployment-destination server of each of one or more server machines included in the target machine group (Step S202). The deployment processing program 1402, for example, can decide on a server with a sufficiently large CPU performance value and memory size as the deployment-destination server. A server with a sufficiently large CPU performance value and memory size, for example, may be a server with a small allocated CPU performance value and a small allocated memory size.

Next, the deployment processing program 1402 references the storage management table 1412 and decides on a volume 242 to be allocated to the target machine group, more accurately, on a volume 242 to be allocated to each of one or more server machines included in the target machine group (Step S203). The deployment processing program 1402, for example, can decide on a volume 242 with sufficient free capacity as the volume 242 to be allocated to the target machine group.

Thereafter, the deployment processing program 1402 creates entries (an entry related to a server machine included in the target machine group and an entry related to the target machine group as a whole) in the machine group management table 1409 related to the target machine group, and registers the created entries in the machine group management table 1409 (Step S204). The performance values registered in fields 1406g through 1406j, which correspond to the corresponding entries in the service template 1406 related to the target machine group, are stored in the fields 1409c through 1409f of the entries related to the target machine group.

Thereafter, the deployment processing program 1402 deploys the target machine group to the deployment-destination server decided in Step S202, more accurately, deploys the respective server machines included in the target machine group to the respective deployment-destination servers decided in Step S202 (Step S205). The deployment of one server machine, which is a virtual machine 6 (hereinafter referred to as "target machine" in the explanation of Step S205) included in the target machine group will be explained specifically below. First, the deployment processing program 1402 instructs the storage system 2, which comprises the volume 242 to be allocated to the target machine, to store the virtual machine data 61 of the target machine in the target machine-allocated volume 242 decided in Step S203. Then, the deployment processing program 1402 notifies the deployment-destination server of the access path to the target machine-allocated volume 242, that is, the volume 242 in which the target machine virtual machine data 61 is stored. The deployment-destination server reads the target machine virtual machine data 61 conforming to the notified access path, and creates a target machine on the server. This makes it possible for the target machine to run on the deployment-destination server, and for the tenant administrator to execute the server program on the target machine.

Thereafter, the deployment processing program 1402 ends the deployment processing.

Next, a first performance information collection process for acquiring a performance measurement value for a server machine, which is a virtual machine 6, will be explained.

Figure 30:
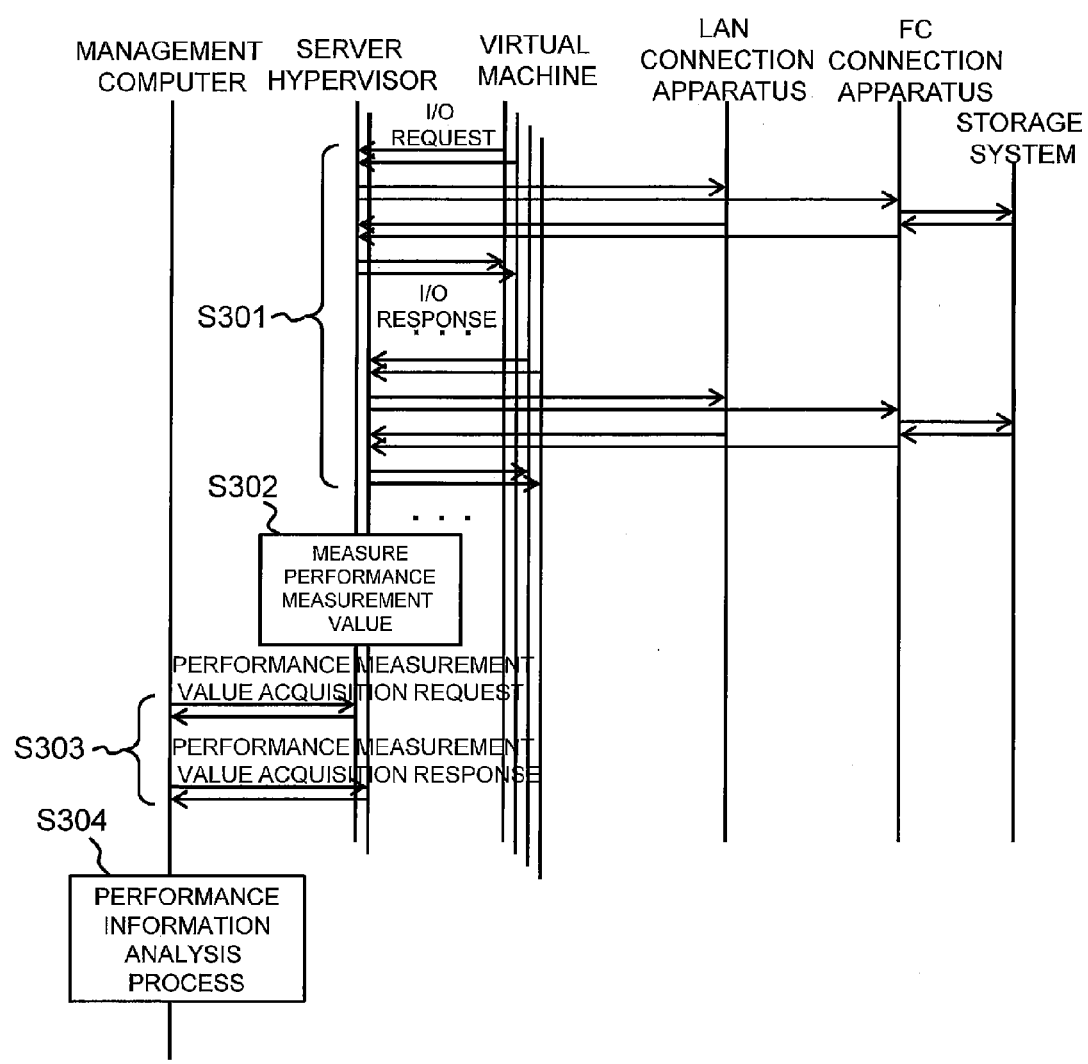
FIG. 30 is a sequence diagram of a first performance information collection process related to the embodiment.

FIG. 30 is a sequence diagram of a first performance information collection process related to the embodiment.

When the provision of a network service, which uses a virtual machine 6, is started by the tenant administrator, the sending and receiving of data is performed between the computer being is used by the user receiving the provision of the network service and a server, and between the server and the storage system 2 (Step S301). For example, in a case where a server program being executed on the virtual machine 6 performs I/O with respect to a volume 242, the virtual machine 6 issues an I/O request to the hypervisor 341 running on this virtual machine 6. The hypervisor 341, which receives the I/O request from the virtual machine 6, transfers the received I/O request to the storage system 2, which comprises the volume 242 being allocated to the virtual machine 6. The I/O request sent from the hypervisor 341 reaches the storage system 2 by way of the FC connection apparatus 4. Thereafter, the storage system 2, which receives the I/O request, sends an I/O response, which is a response with respect to the received I/O request, to the hypervisor 341, which sent the I/O request. The I/O response sent from storage system 2 reaches the hypervisor 341 by way of the FC connection apparatus 4. The hypervisor 341, which receives the I/O response, transfers the received I/O response to the virtual machine 6, which issued the I/O request.

The server hypervisor 341 (more accurately, the performance monitoring program 342 inside the hypervisor 341), either regularly or irregularly (for example, in a case where an I/O has been generated to a volume 242 and/or to the LAN 50), measures a performance measurement value with respect to the virtual machine 6, and registers an entry related to the measured performance measurement value in the virtual machine performance information storage table 343 (Step S302).

The performance information collection program 1403 of the management computer 1, either regularly or irregularly, acquires a performance measurement value for a virtual machine 6 from the hypervisor 341, and stores the acquired performance measurement value in the machine performance management table 1410 (Step S303). Specifically, the performance information collection program 1403 of the management computer 1 sends a performance measurement value acquisition request to the server hypervisor 341. The hypervisor 341, which receives the performance measurement value acquisition request, acquires the performance measurement value with respect to the virtual machine 6 being run by the hypervisor 341 from the virtual machine performance information storage table 343, and sends the acquired performance measurement value to the management computer 1. The management computer 1 performance information collection program 1403 registers an entry related to the acquired performance measurement value from the hypervisor 341 in the machine performance management table 1410.

The processing of Step S301 through Step S303 is performed for each virtual machine 6 provided to the tenant administrator to acquire performance measurement values for each of the virtual machines 6 provided to the tenant administrator.

Thereafter, the management computer 1 performance failure location inference program 1404 performs a performance information analysis process (a first performance information analysis process of FIG. 32, a second performance information analysis process of FIG. 33), which will be explained further below (Step S304).

Next, a second performance information collection process for acquiring a performance measurement value for a server machine, which is a physical machine, will be explained.

Figure 31:
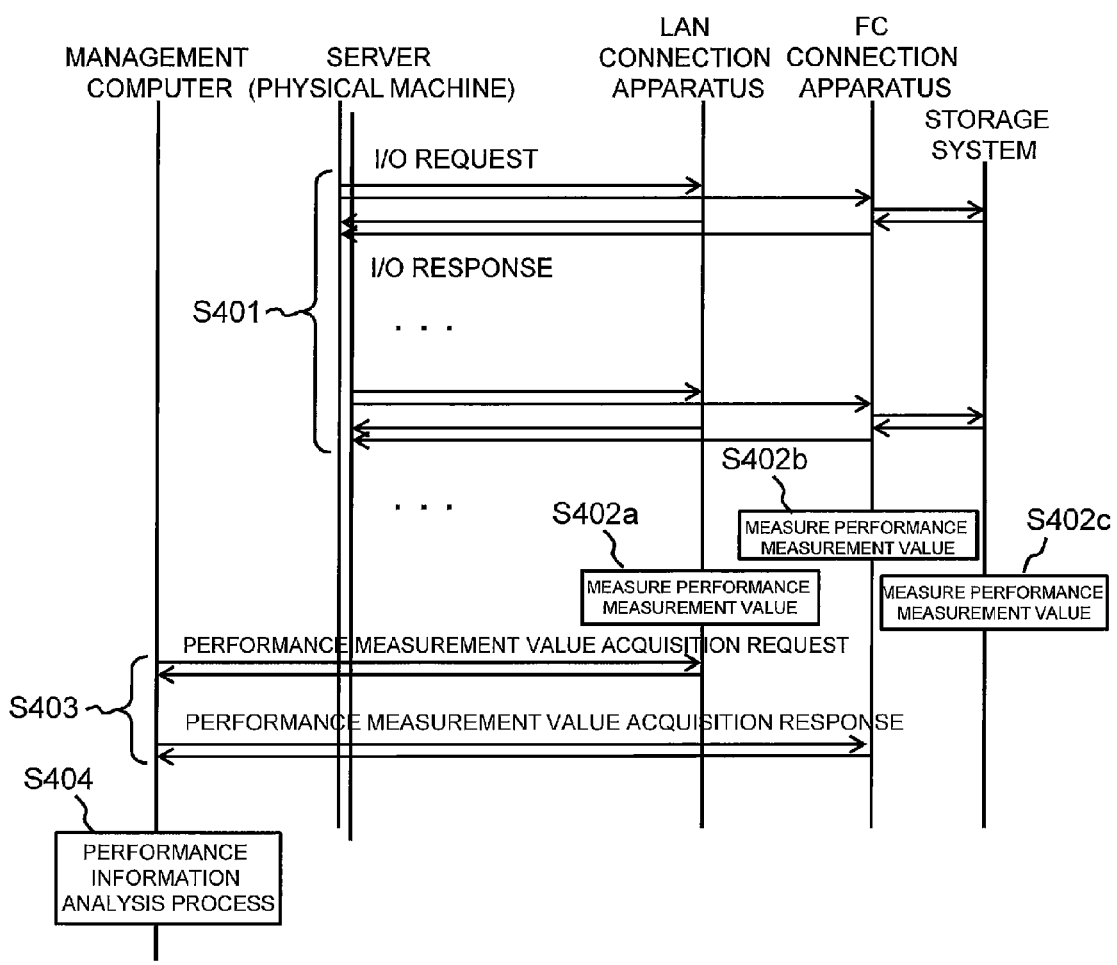
FIG. 31 is a sequence diagram of a second performance information collection process related to the embodiment.

FIG. 31 is a sequence diagram of a second performance information collection process related to the embodiment.

When the provision of a network service, which uses a physical machine, is started by the tenant administrator, the sending and receiving of data is performed between the computer being used by the user receiving the provision of the network service and a server, and between the server and the storage system 2 (Step S401). For example, in a case where a server program being executed on the physical machine performs I/O with respect to a volume 242, the physical machine issues an I/O request to the storage system 2 comprising the volume 242 being allocated to the physical machine. The physical machine-issued I/O request reaches the storage system 2 by way of the FC connection apparatus 4. Thereafter, the storage system 2, which receives the I/O request, sends an I/O response, which is a response to the received I/O request, to the physical machine, which sent the I/O request. The I/O response sent from storage system 2 reaches the physical machine by way of the FC connection apparatus 4.

The performance monitoring program 544 of the LAN connection apparatus 5, either regularly or irregularly (for example, in a case where an I/O has been generated to the physical machine LAN 50), measures a measurement value related to the network I/O for the port being used by the physical machine, and registers an entry related to the measured measurement value in the network performance information storage table 545 (Step 402*a*). The network I/O-related measurement value measured for the port being used by the physical machine corresponds to the network VO-related performance measurement value of the physical machine.

The performance monitoring program 444 of the FC connection apparatus 4, either regularly or irregularly (for example, in a case where an I/O has been generated to a physical machine volume 242), measures a measurement value related to the disk I/O for the port being used by the physical machine, and registers an entry related to the measured measurement value in the Disk I/O performance information storage table 445 (Step S402*b*). The disk I/O-related measurement value measured for the port being used by the physical machine corresponds to the disk I/O-related performance measurement value of the physical machine.

The performance monitoring program 2416 of the storage system 2, either regularly or irregularly (for example, in a case where an I/O is generated for a volume 242), measures a measurement value related to a disk I/O with respect to the volume 242 being allocated to the physical machine, and registers an entry related to the measured measurement value in the volume performance information storage table 2417 (Step S402*c*). The storage system 2-measured measurement value related to the disk I/O with respect to the volume 242 being allocated to the physical machine corresponds to the disk I/O-related performance measurement value of this physical machine.

The management computer 1 performance information collection program 1403, either regularly or irregularly, acquires a performance measurement value with respect to the physical machine from the LAN connection apparatus 5 and the FC connection apparatus 4, and stores the acquired performance measurement value in the machine performance management table 1410 (Step S403). Specifically, the management computer 1 performance information collection program 1403 sends a performance measurement value acquisition request related to the network I/O of the physical machine to the LAN connection apparatus 5. The LAN connection apparatus 5, which receives the performance measurement value acquisition request, acquires the performance measurement value related to the network I/O for the physical machine from the network performance information storage table 545, and sends the acquired performance measurement value to the management computer 1. The management computer 1 performance information collection program 1403 stores the network I/O-related performance measurement value acquired from the LAN connection apparatus 5 in the machine performance management table 1410. The management computer 1 performance information collection program 1403 sends an acquisition request for a performance measurement value related to the disk I/O with respect to the physical machine to the FC connection apparatus 4. The FC connection apparatus 4, which receives the performance measurement value acquisition request, acquires the disk I/O-related performance measurement value for the physical machine from the Disk I/O performance information storage table 445, and sends the acquired performance measurement value to the management computer 1. The management computer 1 performance information collection program 1403 stores the disk I/O-related performance measurement value acquired from the FC connection apparatus 4 in the machine performance management table 1410. The management computer 1 performance information collection program 1403 may acquire the disk I/O-related performance measurement value for the physical machine from the storage system 2.

The processing of Step S401 through Step S403 is performed for each physical machine provided to the tenant administrator to acquire performance measurement values for the respective physical machine provided to the tenant administrator.

Thereafter, the management computer 1 performance failure location inference program 1404 performs a performance information analysis process (a first performance information analysis process of FIG. 32, a second performance information analysis process of FIG. 33), which will be explained below (Step S404).

Figure 32:
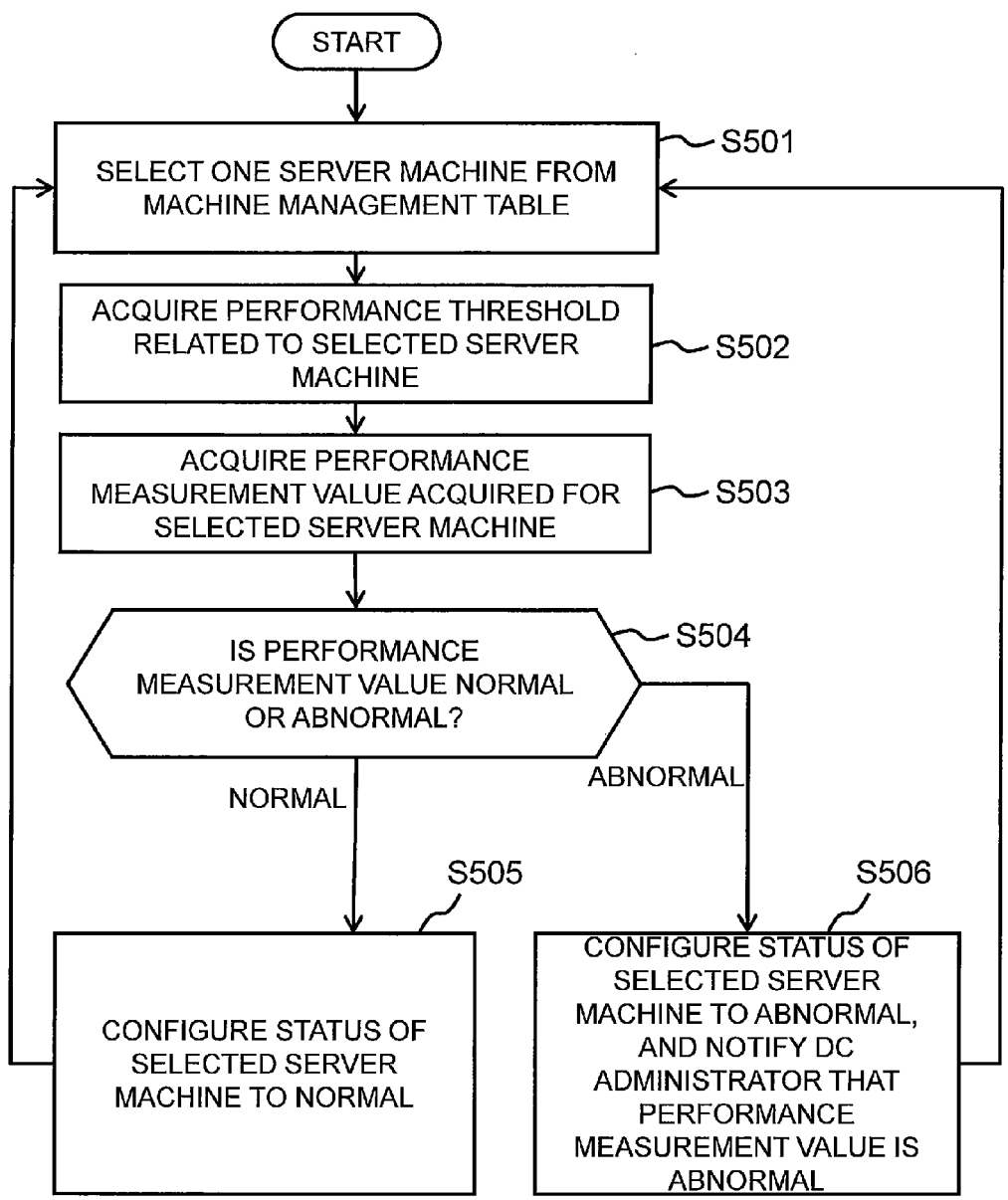
FIG. 32 is a flowchart of a first performance information analysis process related to the embodiment.

FIG. 32 is a flowchart of a first performance information analysis process related to the embodiment.

The first performance information analysis process is performed in Step S304 of FIG. 30 and Step S404 of FIG. 31.

First, the management computer 1 performance failure location inference program 1404 selects one of the server machines managed by the machine management table 1408 (hereinafter referred to as the "target machine" in the explanation of FIG. 32) (Step S501).

Next, the performance failure location inference program 1404 acquires a performance threshold related to the target machine from the target machine-related entry registered in the machine group management table 1409 (Step S502). In the embodiment, in a case where the target machine is a virtual machine 6, the performance failure location inference program 1404 can acquire four types of target machine-related performance thresholds, i.e., a performance threshold for a performance measurement value related to a network I/O, a performance threshold for a performance measurement value related to a disk I/O, a performance threshold for a performance measurement value related to a CPU, and a performance threshold for a performance measurement value related to a memory. Alternatively, in a case where the target machine is a physical machine, the performance failure location inference program 1404 can acquire two types of target machine-related performance thresholds, i.e., a performance threshold for a performance measurement value related to a network I/O and a performance threshold for a performance measurement value related to a disk I/O.

Next, the performance failure location inference program 1404 acquires the performance measurement value acquired for the target machine from the target machine-related machine performance management table 1410 (Step S503). In this embodiment, in a case where the target machine is a virtual machine 6, the performance failure location inference program 1404 can acquire four types of performance measurement values for the target machine, i.e., a performance measurement value related to a network I/O, a performance measurement value related to a disk I/O, a performance measurement value related to a CPU, and a performance measurement value related to a memory. Alternatively, in a case where the target machine is a physical machine, the performance failure location inference program 1404 can acquire two types of performance measurement values for the target machine, i.e., a performance measurement value related to a network I/O and a performance measurement value related to a disk I/O. The performance failure location inference program 1404 can also acquire multiple performance measurement values for each type of performance measurement value.

Thereafter, the performance failure location inference program 1404 determines whether or not the performance measurement value acquired in Step S503 is normal based on the performance threshold acquired in Step S502 (Step S504). For example, in a case where all the types of performance measurement values are normal, that is, a case in which none of the types of performance measurement values exceed the corresponding performance threshold, the performance failure location inference program 1404 can make a determination that the performance measurement values are normal. Alternatively, in a case where any of the types of performance measurement values is abnormal, that is, a case in which any of the types of performance measurement values exceeds the corresponding performance threshold, the performance failure location inference program 1404 can make a determination that the performance measurement values are abnormal. For example, in a case where a prescribed number or more of any of multiple performance measurement values of a certain type are abnormal, the performance failure location inference program 1404 can make a determination that this type of performance measurement value is abnormal.

In a case where the performance measurement value is normal (Step S504: Normal), the performance failure location inference program 1404 stores data showing that the performance measurement value is normal in the status 1409g of the target machine-related entry in the machine group management table 1409 (Step S505). Then, the performance failure location inference program 1404 moves the processing to Step S501. Thereafter, the processing of Step S501 through Step S506 is performed for a server machine, which has yet to be selected from among the server machines being managed by the machine management table 1408.

Alternatively, in a case where the performance measurement value is abnormal (Step 504: Abnormal), the performance failure location inference program 1404 stores data showing that the performance measurement value is abnormal in the status 1409g of the target machine-related entry in the machine group management table 1409 (Step S506). Then, the management computer 1 inferred failure location notification program 1405 notifies the DC administrator that there is an abnormal performance measurement value. Then, the performance failure location inference program 1404 moves the processing to Step S501. Thereafter, the processing of Step S501 through Step S506 is performed for a server machine, which has yet to be selected from among the server machines being managed by the machine management table 1408.

Figure 33:
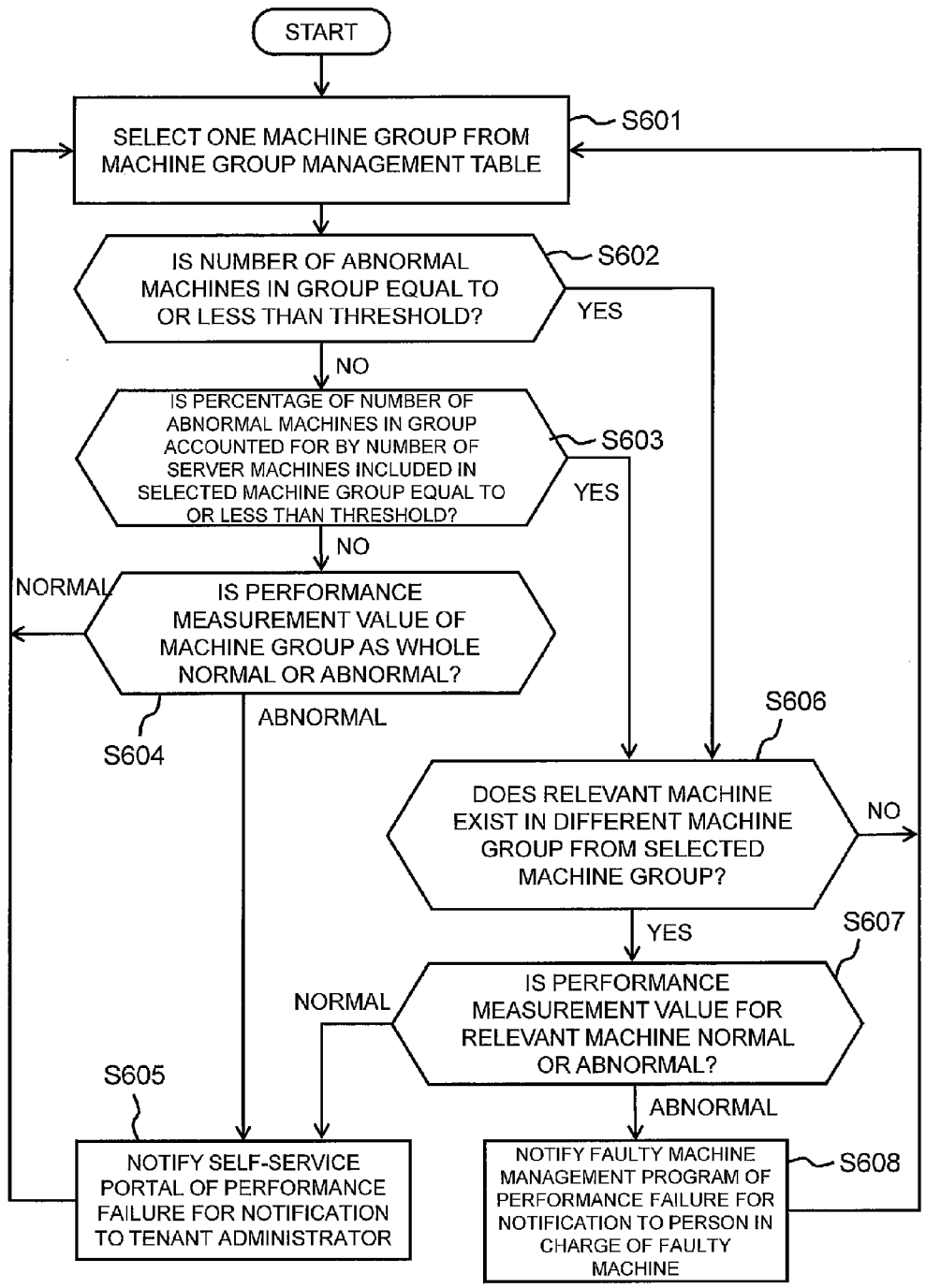
FIG. 33 is a flowchart of a second performance information analysis process related to the embodiment.

FIG. 33 is a flowchart of a second performance information analysis process related to the embodiment.

The second performance information analysis process is performed in Step S304 of FIG. 30 and Step S404 of FIG. 31. The management computer 1, for example, may perform the second performance information analysis process after the first performance information analysis process has ended.

First, the management computer 1 performance failure location inference program 1404 selects one of the machine groups managed by the machine group management table 1409 (hereinafter referred to as the "target machine group" in the explanation of FIG. 33) (Step S601).

Next, the performance failure location inference program 1404 references the respective status 1409g of the entries related to the server machines included in the target machine group of the entries in the machine group management table 1409, and determines whether or not the number (hereinafter referred to as "number of abnormal machines in group") of server machines with an abnormal performance measurement value (hereinafter referred to as the "abnormal machine") (first resource) of the server machines included in the target machine group is equal to or less than a prescribed threshold (Step S602).

In a case where the number of abnormal machines in group is not equal to or less than a threshold (Step S602: NO), the performance failure location inference program 1404 determines whether or not the ratio of the number of abnormal machines in group to the number of server machines included in the target machine group is equal to or less than a prescribed threshold (Step S603).

In a case where the ratio of the number of abnormal machines in group to the number of server machines included in the target machine group is not equal to or less than the threshold (Step S603: NO), the performance failure location inference program 1404 determines whether or not the performance measurement value acquired with respect to the target machine group as a whole is normal based on the performance threshold related to the entire target machine group (Step S604). The performance information of the individual server machines is collected at this time by the management computer 1 issuing a request to the performance monitoring program 342 running on the hypervisor 341 of the host computer 3 and acquiring this information; by the management computer 1 issuing a request to the performance monitoring program 444 of the FC connection apparatus 4 and acquiring the information in Disk I/O performance information storage table 445; or by the management computer 1 issuing a request to the performance monitoring program 544 of the LAN connection apparatus 5 and acquiring the information in network performance information storage table 545.

In a case where the performance measurement value for the target machine group as a whole is normal (Step S604: Normal), the performance failure location inference program 1404 determines that a performance failure has not occurred, and moves the processing to Step S601. Thereafter, the processing of Step S601 through Step S608 is performed for a machine group, which has yet to be selected from among the machine groups managed by the machine group management table 1409.

Alternatively, in a case where the performance measurement value for the target machine group as a whole is abnormal (Step S604: Abnormal), the performance failure location inference program 1404 determines that a performance failure has occurred and that the cause of the performance failure is on the business service side, that is, is in the business processing of the tenant administrator. Then, the management computer 1 inferred failure location notification program 1405 notifies the tenant administrator to the effect that a performance failure, the cause of which is in the business processing of the tenant administrator, has occurred. Specifically, the inferred failure location notification program 1405 notifies the self-service portal program, which used by the relevant tenant administrator to manage the provision service, of the failure. This makes it possible for the failure information to be confirmed when the tenant administrator accesses his own self-service portal from the management terminal 7 via the self-service portal access program 7401 (Step S605). Then, the performance failure location inference program 1404 moves the processing to Step S601. Thereafter, the processing of Step S601 through Step S608 is performed for a machine group, which has yet to be selected from among the machine groups managed by the machine group management table 1409.

In a case where either it has been determined in Step S602 that the number of abnormal machines in group is equal to or less than the threshold (Step S602: YES), or it has been determined in Step S603 that the ratio of the number of abnormal machines in group to the number of server machines in the target machine group is equal to or less than the threshold (Step S603: YES), the performance failure location inference program 1404 references the machine management table 1408 and the machine group management table 1409, and determines whether or not there exists a server machine (hereinafter referred to as the "related machine") (second resource) to which is allocated a volume 242 (to include the same volume 242 as the volume 242 allocated to the abnormal machine) related to the volume 242 allocated to the abnormal machine in a different machine group than the target machine group (Step S606). As used here, the relationship between the volume 242 allocated to the abnormal machine and the volume 242 allocated to the related machine, for example, refers to the fact that both volumes 242 have been created based on a storage area of the same storage system 2. That is, the storage system 2, which is the apparatus involved in the provision of both server machines, is the same for both the abnormal machine and the related machine.

In a case where a related machine does not exist (Step S606: NO), the performance failure location inference program 1404 determines that a performance failure has not occurred, and moves the processing to Step S601. Thereafter, the processing of Step S601 through Step S608 is performed for a machine group, which has yet to be selected from among the machine groups managed by the machine group management table 1409.

Alternatively, in a case where a related machine exists (Step S606: YES), the performance failure location inference program 1404 references the status 1409g of the related machine-related entry from among the entries of the machine group management table 1409, and determines whether or not the performance measurement value for the related machine is normal (Step S607).

In a case where the performance measurement value for the related machine is normal (Step S607: Normal), the performance failure location inference program 1404 moves the processing to Step S605. That is, the performance failure location inference program 1404 determines in this case that a performance failure has occurred and that the cause of the performance failure lies in the business processing of the tenant administrator.

Alternatively, in a case where the performance measurement value for the related machine is abnormal (Step S607: Abnormal), the performance failure location inference program 1404 determines that a performance failure has occurred, and that the cause of the performance failure lies in the apparatus involved in the provision of the abnormal machine, for example, in the storage system 2, which comprises the volume 242 allocated to the abnormal machine. Then, for notifying the person in charge of the faulty apparatus to the effect that a performance failure caused by the apparatus involved in the provision of the abnormal machine has occurred, in a case where the cause of the performance failure is the storage system 2, the inferred failure location notification program 1405 notifies the operation management program 2414 of the storage system 2 so that the administrator of the storage system 2 can confirm the failure from the image output device 26 of the storage system 2. In a case where the host computer 3 is the cause of the performance failure, the inferred failure location notification program 1405 notifies the host computer hypervisor 341 so that the host computer administrator can confirm the failure from the image output device 36. In a case where the FC connection apparatus 4 is the cause of the performance failure, the inferred failure location notification program 1405 notifies the management program 442 and in a case where the LAN connection apparatus 5 is the cause of the performance failure, the inferred failure location notification program 1405 notifies the management program 542, thereby enabling the respective administrators to confirm the failure via the management communication I/F (Step S608). Then, the performance failure location inference program 1404 moves the processing to Step S601. Thereafter, the processing of Step S601 through Step S608 is performed for a machine group, which has yet to be selected from among the machine groups managed by the machine group management table 1409. Notifying the program, which manages the relevant failure location, of a failure in accordance with the failure location like this, makes it possible to send an appropriate notification to the administrator, who has administrative authority over the relevant failure location.

The preceding has been an explanation of the embodiment. The management computer 1 can learn the respective applications of the server machines included in the machine group, which the tenant administrator uses, by presenting the tenant administrator with catalog data comprising data showing the applications of the server machines and allowing the tenant administrator to select a machine group. That is, the management computer 1 can predict to a certain degree the kind of server program to be executed on a server machine provided to the tenant administrator. The management computer 1, based on the application of each server machine, that is, by taking into account the kind of server program to be executed on the server machine, is able to configure a performance threshold for evaluating a performance measurement value acquired for the server machine. Then, the management computer 1 acquires a performance measurement value for each server machine included in the machine group provided to the tenant administrator, and, based on the performance threshold, determines whether or not the acquired performance measurement value is normal. The management computer 1 can determine whether or not a performance failure has occurred based on the number of server machines for which the performance measurement value is abnormal of the server machines included in the machine group provided to the tenant administrator, and can also determine whether the cause of the performance failure lies on the business service side or on the resource provision side. The management computer 1 is not able to directly monitor the state of a server machine, which belongs to the management area of the tenant administrator, or a server program being executed on the server machine, but by acquiring a performance measurement value and evaluating the acquired performance measurement value based on a performance threshold like this, can determine whether or not a performance failure has occurred inside the computer system 100, and in a case where a performance failure has occurred, can identify whether the cause thereof lies on the business service side or on the resource provision side.

Needless to say, the present invention is not limited to the embodiment explained hereinabove, and various changes are possible without departing from the gist thereof.

For example, in the second performance information analysis process, the embodiment is merely one example of the determination as to the circumstances under which a performance failure occurs, and the determination as to the circumstances under which the cause of this performance failure is on the business service side and the circumstances under which the cause of this performance failure is on the resource provision side, and the present invention is not limited to the determination method shown in FIG. 33. For example, in a case where either the number of abnormal machines in group is not equal to or less than a threshold, or the ratio of the number of abnormal machines in group to the number of server machines included in the target machine group is not equal to or less than a threshold, the computer 1 may determine that the cause of the performance failure lies in the business processing of the tenant administrator.

REFERENCE SIGNS LIST

1 Management computer
2 Storage system
3 Host computer
4 FC connection apparatus
5 LAN connection apparatus

The invention claimed is:
1. A management system, configured to manage a computer system configured to provide a resource to be used to provide virtual or physical machines to a tenant, comprising:
a storage device; and
a control device coupled to the storage device, wherein the control device is configured to:
(A) output catalog data, which show at least one resource group and a use of the resource group, and receive a selection of one of the at least one resource group;
(B) provide at least a plurality of the virtual machines with the selected resource group to the tenant;
(C) determine whether a measurement value, which relates to a processing performance of a network service processed in the virtual machine provided by the selected resource group and which can be monitored by the management system, is normal or abnormal, and
(D) determine, based on a number of abnormal machines in the resource group, which is the virtual or a physical machine whose measurement value relating to the processing performance is abnormal, whether a network service failure caused by the processing of the network service using the selected resource group has occurred, or whether a resource failure caused by an apparatus providing the selected resource group has occurred, wherein a threshold value used for determining whether the measurement value is normal is set based on the use in the output catalog data for the selected resource group without requiring information of the network service which is actually processed with the selected resource by the tenant.

2. A management system according to claim 1, wherein the control device is further configured to determine whether a resource failure caused by an apparatus related to the provision of any of the selected resource groups has occurred, or whether neither the business service failure nor the resource failure has occurred.

3. A management system according to claim 1, wherein the control device is configured to notify, in a case where determination is made that the business service failure has occurred, a management program of the business service notification to that effect.

4. A management system according to claim 1, wherein the control device is configured to notify, in a case where determination has been made that the resource failure has occurred, a management program of the resource that the resource failure has occurred.

5. A management system according to claim 1, wherein the control device is configured to output catalog data showing an application, a configuration, and performance threshold of each of one or more resources included in each resource group.

6. A management system according to claim 1, wherein the control device is configured to determine that the business service failure has occurred in a case where the number of abnormal virtual or physical machines in the resource groups is larger than a prescribed value.

7. A management system according to claim 1, wherein the control device is configured to determine that the business service failure has occurred in a case where the ratio of the number of abnormal virtual or physical machines in the resource group to the number of virtual or physical machines provided by the selected resource group is larger than a prescribed value.

8. A management system according to claim 1, wherein the control device is configured to:

determine with respect to a first resource group whether there exists a first virtual machine whose measurement value is abnormal, and, in addition, in a case where the number of abnormal virtual or physical machines in the first resource group is smaller than a prescribed value and/or the ratio of the number of abnormal virtual or physical machines in the first resource group to the number of virtual or physical machines provided by the first resource group is smaller than a prescribed value, whether there exists in a second resource group different from the first resource group a second virtual machine to which a second physical machine is allocated, which is related to a first physical machine allocated to the first virtual machine; and determine that the resource failure has occurred in a case where the measurement value for the second virtual machine is also abnormal.

9. A management system according to claim 8, wherein the computer system comprises multiple storage systems providing volumes and the control device is configured to recognize that the first physical machine and the second physical machine are related in a case where at least one of the volumes is provided by the same storage system to the first physical machine and the second physical machine.

10. A management system according to claim 7, wherein the measurement value comprises an input/output response time with respect to a volume.

11. A management system according to claim 9, wherein the measurement value comprises an input/output response time with respect to a volume, virtual machine CPU utilization, and virtual machine memory usage.

12. A method for managing a computer system, which is configured to provide a resource to be used to provide virtual or physical machines to a tenant, the management method comprising:

(A) outputting catalog data, which show at least one resource group and a use of the resource group, and receiving a selection of one of the at least one resource group;

(B) providing at least a plurality of the virtual machines with the selected resource group to the tenant;

(C) determining whether a measurement value, which relates to a processing performance of a network service processed in the virtual machine provided by the selected resource group and which can be monitored by the management system, is normal or abnormal, and (D) determining, based on the number of abnormal machines in the resource group, which is the virtual or a physical machine whose measurement value relating to the processing performance is abnormal, whether a network service failure caused by the processing of the network service using the selected resource group has occurred, or whether a resource failure caused by an apparatus providing the selected resource group has occurred, wherein a threshold value used for determining whether the measurement value is normal is set based on the use in the output catalog data for the selected resource group without requiring information of the network service which is actually processed with the selected resource by the tenant.

13. A non-transitory computer-readable medium encoded with a computer program, for execution by a computer for managing a computer system, which provides a resource to be used in the provisioning of virtual or physical machines to a tenant, the computer program causing the computer to:

(A) output catalog data, which show at least one resource group and a use of the resource group, and receive a selection of one of the at least one resource group;

(B) provide at least a plurality of the virtual machines with the selected resource group to the tenant;

(C) determine whether a measurement value, which relates to a processing performance of a network service processed in the virtual or physical machine provided by the selected resource group and which can be monitored by the management system, is normal or abnormal, and (D) determine, based on the number of abnormal machines in the resource group, which is the virtual or a physical machine whose measurement value relates to the processing performance is abnormal, whether a network service failure caused by the processing of the network service using the selected resource group has occurred, or whether a resource failure caused by an apparatus providing the selected resource group has occurred, wherein a threshold value used for determining whether the measurement value is normal is set based on the use in the output catalog data for the selected resource group without requiring information of the network service which is actually processed with the selected resource by the tenant.

\* \* \* \* \*